US012580339B2

(12) United States Patent
Frank et al.

(10) Patent No.: US 12,580,339 B2
(45) Date of Patent: Mar. 17, 2026

(54) SPRING LOADED ELECTRICAL CONNECTOR

(71) Applicant: Amphenol Corporation, Wallingford, CT (US)

(72) Inventors: Ronald I. Frank, Sharon, MA (US); James R. Meszaros, Middleboro, MA (US); George L. Goulart, Dighton, MA (US); Braden J. Ishaug, Porter Ranch, CA (US); Robert G. Hennemuth, III, Franklin, MA (US); Michael D. Smith, North Easton, MA (US); Michael A. Yashin, Cranston, RI (US); Gordon J. Udall, North Attleboro, MA (US); Daniel R. McNevin, Norton, MA (US); James Joseph Moriarty, Brockton, MA (US)

(73) Assignee: AMPHENOL CORPORATION, Wallingford, CT (US)

( * ) Notice: Subject to any disclaimer, the term of this patent is extended or adjusted under 35 U.S.C. 154(b) by 462 days.

(21) Appl. No.: 18/166,857

(22) Filed: Feb. 9, 2023

(65) Prior Publication Data

US 2024/0275083 A1 Aug. 15, 2024

(51) Int. Cl.
*H01R 13/447* (2006.01)
*H01R 13/453* (2006.01)
(Continued)

(52) U.S. Cl.
CPC ......... *H01R 13/447* (2013.01); *H01R 13/453* (2013.01); *H01R 13/4534* (2013.01);
(Continued)

(58) Field of Classification Search
CPC .................... H01R 13/44–4538; H01R 13/625
(Continued)

(56) References Cited

U.S. PATENT DOCUMENTS 2,066,770 A 1/1937 Doane
3,693,133 A 9/1972 Harbonn et al.
(Continued)

FOREIGN PATENT DOCUMENTS

DE 102011101767 A1 11/2012
JP S5213681 A 2/1977
(Continued)

OTHER PUBLICATIONS

CA Patent Application 3125243; Office Action dated May 30, 2025; 5 pages.

(Continued)

*Primary Examiner* — Christopher M Koehler
*Assistant Examiner* — Gregory L Mangot
(74) *Attorney, Agent, or Firm* — CANTOR COLBURN LLP

(57) ABSTRACT

Electrical connectors and assemblies may include a housing and a contact member therein. The contact member includes electrical contacts. A contact barrier is connected to the housing and movable between a closed state and an open state. In the open state, the contact member is exposed and, in the closed state, the contact member is protected by the contact barrier. The contact barrier is biased into the closed state. Electrical connectors and assemblies may include a housing with a core assembly having at least one electrical contact. A rotatable coupling member is rotatably attached to an end of the housing and includes a coupling housing, at least one latching element coupled to an inner surface of the coupling housing, and at least one center biasing element configured to bias and self-center the rotatable coupling member relative to the housing into a ready-to-connect orientation.

15 Claims, 23 Drawing Sheets

(51) Int. Cl.
*H01R 13/645* (2006.01)
*H01R 9/05* (2006.01)

(52) U.S. Cl.
CPC ....... *H01R 13/4538* (2013.01); *H01R 9/0521* (2013.01); *H01R 13/6456* (2013.01)

(58) Field of Classification Search
USPC .......................................... 439/135, 136, 142
See application file for complete search history.

(56) References Cited

U.S. PATENT DOCUMENTS

| | | | | |
|---|---|---|---|---|
| 3,701,965 | A | 10/1972 | Durocher et al. | |
| 4,065,197 | A | 12/1977 | Kuist et al. | |
| 4,217,019 | A * | 8/1980 | Cameron | H01R 13/44 439/138 |
| 5,205,749 | A | 4/1993 | Weingartner | |
| 5,230,632 | A | 7/1993 | Baumberger et al. | |
| 5,248,261 | A | 9/1993 | Controy-Wass et al. | |
| 5,310,352 | A | 5/1994 | Mroczkowski et al. | |
| 5,490,790 | A | 2/1996 | Okada | |
| 5,716,224 | A * | 2/1998 | Masuda | H01R 13/4536 439/138 |
| 5,820,549 | A | 10/1998 | Marian, Jr. | |
| 5,857,866 | A | 1/1999 | Felps | |
| 6,165,009 | A | 12/2000 | Anbo et al. | |
| 6,248,261 | B1 | 6/2001 | Takemura et al. | |
| 6,315,576 | B1 | 11/2001 | Neidich | |
| 6,719,578 | B1 | 4/2004 | Klassen et al. | |
| 6,884,083 | B2 | 4/2005 | Shepherd | |
| 6,908,233 | B2 | 6/2005 | Nakajima et al. | |
| 6,935,881 | B2 | 8/2005 | Kainz et al. | |
| 7,128,592 | B2 | 10/2006 | Li | |
| 7,517,222 | B2 | 4/2009 | Rohrbach et al. | |
| 7,946,892 | B2 | 5/2011 | Carboni et al. | |
| 8,057,241 | B2 | 11/2011 | Tamura | |
| 8,506,314 | B2 | 8/2013 | Gramsamer et al. | |
| 9,563,024 | B2 | 2/2017 | Zhong et al. | |
| 9,570,829 | B2 | 2/2017 | Wimmer | |
| 10,050,367 | B1 | 8/2018 | Frank et al. | |
| 10,186,804 | B2 | 1/2019 | Menolotto et al. | |
| 10,823,914 | B2 | 11/2020 | Dobler | |
| 11,128,080 | B2 | 9/2021 | Frank et al. | |
| 12,046,850 | B2 * | 7/2024 | Kozono | H01R 13/629 |
| 12,451,639 | B2 * | 10/2025 | Daily | H01R 13/453 |
| 2003/0077929 | A1 * | 4/2003 | Funatsu | H01R 13/4532 439/137 |
| 2005/0164544 | A1 | 7/2005 | Yamaguchi et al. | |
| 2006/0009055 | A1 | 1/2006 | Li | |
| 2014/0270645 | A1 | 9/2014 | Toth | |
| 2019/0173218 | A1 * | 6/2019 | Frank | H01R 13/2435 |
| 2022/0181814 | A1 | 6/2022 | Frank et al. | |

FOREIGN PATENT DOCUMENTS

| | | | |
|---|---|---|---|
| JP | H10340758 | A | 12/1998 |
| JP | 2005302689 | A | 10/2005 |
| JP | 2014207082 | A | 10/2014 |
| WO | 2013048396 | A1 | 4/2013 |

OTHER PUBLICATIONS

European Application No. 18813716.0-1201; Office Action dated Jun. 6, 2024; 10 pages.
European Application No. 20748313.2-1201; Office Action dated Oct. 17, 2024; 11 pages.
International Preliminary Report on Patentability for International Application No. PCT/US2020/014928; International Filing Date: Jan. 24, 2020; Date of Mailing: Mar. 10, 2020; 4 pages.
International Search Report for International Application No. PCT/US2024/014827; International Filing Date: Feb. 7, 2024; Date of Mailing: Jul. 3, 2024; 4 pages.
Japanese Application No. 2023-106194; Office Action dated Jun. 11, 2024; 9 pages.
Written Opinion for International Application No. PCT/US2024/014827; International Filing Date: Feb. 7, 2024; Date of Mailing: Jul. 3, 2024; 10 pages.

* cited by examiner

SPRING LOADED ELECTRICAL CONNECTOR

BACKGROUND

Conventional high density electrical connectors often have contact intermittency and mating reliability issues on the mating interface due to the tight pitch and density necessary to achieve a small package size which results in tolerance stack-up related connectivity failures. In addition, conventional high density connectors are costly to manufacture and bulky due to increased signal count.

SUMMARY

The present disclosure describes an electrical connector that may provide a high density of contacts without increasing the size of the connector and where when mated with another connector of a connector system, provides stability and consistent signal integrity to the connector system. Accordingly, the present disclosure may provide an electrical connector that comprises a housing that has a mating interface end section, an opposite cable termination end section, and an inner support member. A core is slidably coupled to the inner support member of the housing and includes a receiving end and a spring engagement end. A spring member is received inside of the housing and behind the core for abutment with the spring engagement end of the core. An interposer may be received in the receiving end of the core and remote from the spring member. The core is axially slidable with respect to the inner support member along a longitudinal axis of the housing between an unmated position, in which the spring member pushes the core outwardly away from the cable termination end of the housing, and a mated position, in which the core pushes inwardly against the spring member.

In an embodiment, the electrical connector includes a contact member coupled to the core where the contact member has one end adjacent to the interposer and another end near or at the cable termination end section of the housing. The contact member may be a flexible printed circuit board that has an end face and an opposite tail end. The interposer may include at least one contact side for electrically connecting with the contact member. The interposer may be supported in the receiving end of the core by the inner support member of the housing.

In other embodiments, the at least one contact side includes a plurality of individual contacts that electrical connect with the contact member coupled to the core; the interposer includes a second contact side that is opposite to at least one contact side for electrically connecting with a mating connector; and one or more alignment pins may be provided that extend through the interposer and into the core to align the interposer with the contact member. These alignment pins may be fine alignment features that also extend through to the mating connector to ensure fine enough alignment between the connectors so that all contacts line up with the mating pad of the flex circuits. In another embodiment, the inner support member of the housing is a longitudinally extending center post and the center post has a distal free end that extends beyond the mating interface end section of the housing and through the interposer. In one embodiment, the spring member is one or more wave springs.

The present disclosure may also include an electrical connector that comprises a housing having a mating interface end section, an opposite cable termination end section, and an inner support member, a core is slidably coupled to the inner support member of the housing and includes a receiving end and a spring engagement end. A spring member is received inside of the housing and behind the core for abutment with the spring engagement end of the core. A first contact member is coupled to the core. A double-sided contact interposer may be received in the receiving end of the core and remote from the spring member and includes opposite first and second contact sides, the first contact side is configured to electrically connect with the first contact member and the second contact side is configured to electrically connect with a mating connector. The core is axially slidable with respect to the inner support member along a longitudinal axis of the housing between an unmated position, in which the spring member pushes the core outwardly away from the cable termination end of the housing, and a mated position, in which the core pushes inwardly against the spring member.

In one embodiment, the first contact member coupled to the core is a flexible printed circuit board that has an end face in contact with the first contact side of the double-sided contact interposer and a tail end located at or near the cable termination end section of the housing. In another embodiment, the contact member may be a conventional rigid printed circuit board. The first and second contact sides of the double-sided contact interposer may include a plurality of individual contacts. In another embodiment, the double-sided contact interposer has a wafer body supporting the plurality of individual contacts and each individual contact is a C-clip. The inner support member of the housing may be a longitudinally extending center post that has a distal free end that extends beyond the mating interface end section of the housing and through the double-sided contact interposer.

In an embodiment, a mating connector is coupled to the housing when the core is in the mated position such that a second contact member of the mating connector is received in the core and electrically connects with the second side of the double-sided contact interposer and the first contact member electrically connects to the first side of the double-sided contact interposer. The second contact member may be a flexible printed circuit board having an end face that abuts the second contact side of the double-sided contact interposer. In yet another embodiment, an outer coupling member is received on the mating interface end section of the housing for coupling the mating connector to the housing. In other embodiments, the inner support member of the housing is a longitudinally extending center post where the post has a distal free end that extends beyond the mating interface end section of the housing, through the double-sided contact interposer and engages with a corresponding post of the mating connector; one or more alignment pins may extend through the first contact member, the double-sided contact interposer, and the second contact member for alignment thereof, and the spring member is one or more wave springs. In another embodiment, keyways may be provided on the connector and the mating connector which act as gross alignment features for proper alignment of the connectors.

The present disclosure may yet provide an electrical connector that comprises a housing that has a mating interface end section and an opposite cable termination end section and the housing has an inner support member, a contact carrier is slidably coupled to the housing, the contact carrier includes a receiving end and a spring engagement end, and the contact carrier supports at least one contact member, at least one spring member received inside of the housing and adjacent the contact carrier for abutment with the spring engagement end of the contact carrier, and an interposer is received in the receiving end of the contact carrier and remote from the spring member. The contact carrier is slidable with respect to the housing along a mating axis between unmated and mated positions.

In certain embodiments, the interposer includes at least one contact side for electrically connecting with the contact member; the at least one contact side includes a plurality of individual contacts that electrically connect with the contact member coupled to the contact carrier; and/or the interposer includes a second contact side that is opposite to the at least one contact side for electrically connecting with a mating connector. In other embodiments, one or more alignment pins that extend through the interposer and into the contact carrier to align the interposer with the contact member and/or a coupling member associated with the housing for coupling the mating connector to the housing.

The present disclosure may yet still provide an electrical connector that comprises a housing that has a mating interface end section and an opposite cable termination end section, a contact carrier slidably coupled to the housing, the contact carrier that includes a receiving end and a spring engagement end, and the contact carrier supports at least one contact member, at least one spring member is received inside of the housing and adjacent the contact carrier for abutment with the spring engagement end of the contact carrier, an interposer is received in the receiving end of the contact carrier and remote from the spring member, and a coupling member is associated with the housing. The contact carrier is slidable with respect to the housing along a mating axis between unmated and mated positions.

In some embodiments, the contact member is a flexible printed circuit board; the interposer has a wafer body supporting a plurality of individual contacts and each individual contact is a C-clip; and/or one or more alignment pins extending through the first contact member, the interposer, and the second contact member for alignment thereof.

The present disclosure may also provide an electrical connector that comprises a housing that has receiving area and a mating interface and a contact carrier received in the housing. The contact carrier may include a receiving portion and a spring engagement portion, and supports a contact member. An interposer is mounted on the receiving portion of the contact carrier with the contact member therebetween. One or more spring members are provided which are operatively associated with the spring engagement portion of the contact carrier. The contact carrier is movable with respect to the housing between unmated and mated electrical positions along an axis that is perpendicular or substantially perpendicular to a longitudinal mating axis.

In certain embodiments, the contact member is a flexible circuit board; the interposer includes at least one contact side for electrically connecting with the contact member; the at least one contact side includes a plurality of individual contacts that electrical connect with the contact member coupled to the contact carrier; and/or the interposer includes a second contact side that is opposite to the at least one contact side for electrically connecting with a mating connector. In an embodiment, the electrical connector may further comprise one or more alignment pins that extend through the contact carrier and into or through the interposer to align the interposer with a contact member of a mating connector.

The present disclosure may further provide an electrical connector assembly that comprises a receptacle that comprises a housing that has a receiving area, a contact carrier received in the housing wherein the contact carrier includes a receiving portion and a spring engagement portion, and the contact carrier supporting a first contact member, an interposer mounted on the receiving portion of the contact carrier with the contact member therebetween, and one or more spring members operatively associated with the spring engagement portion of the contact carrier. The contact carrier is movable with respect to the housing between unmated and mated electrical positions. The assembly may also comprise a plug that comprises a housing that has a mating interface configured for insertion into the receiving area of the housing and has a second contact member configured to engage the interposer of the housing on a side opposite the first contact member.

In one embodiment, the contact carrier of the assembly moves between the unmated and mated electrical positions along an axis that is perpendicular or substantially perpendicular to a longitudinal mating axis of the receptacle and plug. In another embodiment, one or more alignment pins extend through the first contact member, the interposer, and the second contact member for alignment thereof.

In other embodiments, the assembly further comprises a latching mechanism for securing the contact carrier in the mated electrical position; the latching mechanism is a cam member configured to rotate between inactive and active positions to move the contact member of the plug which moves the contact carrier or contact system of the receptacle between the unmated and mated electrical positions, respectively; the cam member may be rotated a select or predetermined number of degrees, such as about 45, about 90, about 135, about 180, or about 225 degrees, for example, (or any other appropriate degree of angle) from the inactive position to the active position; the cam member includes a stem that has a width and a thickness, and the width is greater than the thickness; the cam member has an end coupled to a coupling nut of the plug; the latching mechanism is a slide latch member configured to slide between inactive and active positions to move the contact member of the plug which moves the contact carrier or contact system of the receptacle between the unmated and mated electrical positions, respectively; and/or the plug includes an elevator support associated with the second contact member, the elevator support is configured to move between first and second positions in concert with the inactive and active positions, respectively, of the slide latch member; and/or the latching mechanism includes a latch activation release at the mating interface of the plug configured to depress when the plug is mated with the receptacle.

In another embodiment, the latching mechanism may comprise a latch activation release system that will only allow the activation of the latching/mating mechanism if this system is engaged within the mating receptacle (i.e. fully mated). This latch activation release system may comprise a spring probe system at the nose of the plug that depresses when mated with the receptacle and subsequently allows the engagement of the coupling mechanism and thus latching activation.

The present disclosure may also provide an electrical connector the comprises a housing that has a receiving area and a mating interface, a contact carrier received in the housing, the contact carrier includes a receiving portion and a spring engagement portion, and the contact carrier supports a contact member. A contact system is mounted on a face of the contact member. One or more spring members are operatively associated with the spring engagement portion of the contact carrier. The contact carrier is movable with respect to the housing between unmated and mated electrical positions.

In some embodiments, the contact member is a flexible circuit board; the contact system includes at least one contact side for electrically connecting with the face of the contact member; the contact system includes a plurality of individual contacts that electrical connect with the face of the contact member; the electrical connector is a receptacle; the contact carrier moves with respect to the housing between the unmated and mated electrical positions along an axis that is perpendicular or substantially perpendicular to a longitudinal mating axis; and/or the electrical connector further comprises one or more alignment pins that extend through the contact carrier and the contact member.

The present disclosure may yet further provide an electrical connector assembly that comprises a first connector that includes a housing that has a mating interface, a contact carrier that has a receiving portion and a spring engagement portion, the contact carrier supports a first contact member, and the contact carrier is movable with respect to the housing between unmated and mated electrical positions. A contact system is mounted on the first contact member. One or more spring members are operatively associated with the spring engagement portion of the contact carrier. The assembly includes a second connector that includes a housing that has a mating interface configured to mate with the mating interface of the housing of the first connector. The second connector has a second contact member. The contact system is between the first and second contact members when the first and second connectors are electrically mated.

In certain embodiments, the first connector is a receptacle and the second connector is a plug; each of the first and second contact members is a flexible printed circuit board; and/or the contact carrier moves between the unmated and mated electrical positions along an axis that is perpendicular or substantially perpendicular to a longitudinal mating axis of the first and second connectors.

The present disclosure may further provide an electrical connector assembly that comprises a first connector that includes a housing that has a mating interface, a contact carrier that has a receiving portion and a spring engagement portion, the contact carrier supports a first contact member, and the contact carrier is movable with respect to the housing between unmated and mated electrical positions. An interposer is mounted on the receiving portion of the contact carrier with the contact member therebetween. One or more spring members are operatively associated with the spring engagement portion of the contact carrier. The assembly includes second connector that includes a housing that has a mating interface configured to mate with the mating interface of the housing of the first connector, the second connector having a second contact member configured to engage the interposer. The interposer is between the first and second contact members when the first and second connectors are electrically mated.

In some embodiments, the first connector is a receptacle and the second connector is a plug; each of the first and second contact members is a flexible printed circuit board; and/or the contact carrier moves between the unmated and mated electrical positions along an axis that is perpendicular or substantially perpendicular to a longitudinal mating axis of the first and second connectors.

In other embodiments, the electrical connector assembly may further comprise a latching mechanism for securing the connector assembly in the mated electrical position; the latching mechanism is a cam member configured to rotate between inactive and active positions to move the second contact member which moves the contact carrier between the unmated and mated electrical positions, respectively; the second connector includes an elevator support associated with the second contact member, the elevator support is configured to move between first and second positions in concert with the inactive and active positions, respectively, of the cam member; the latching mechanism is a slide latch member configured to slide between inactive and active positions to move the second contact member which moves the contact carrier between the unmated and mated electrical positions, respectively; the second connector includes an elevator support associated with the second contact member, the elevator support is configured to move between first and second positions in concert with the inactive and active positions, respectively, of the slide latch member; and/or the latching mechanism includes a latch activation release at the mating interface of the second connector configured to depress when the first and second connectors are mated.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawing figures.

DETAILED DESCRIPTION

Figure 1:
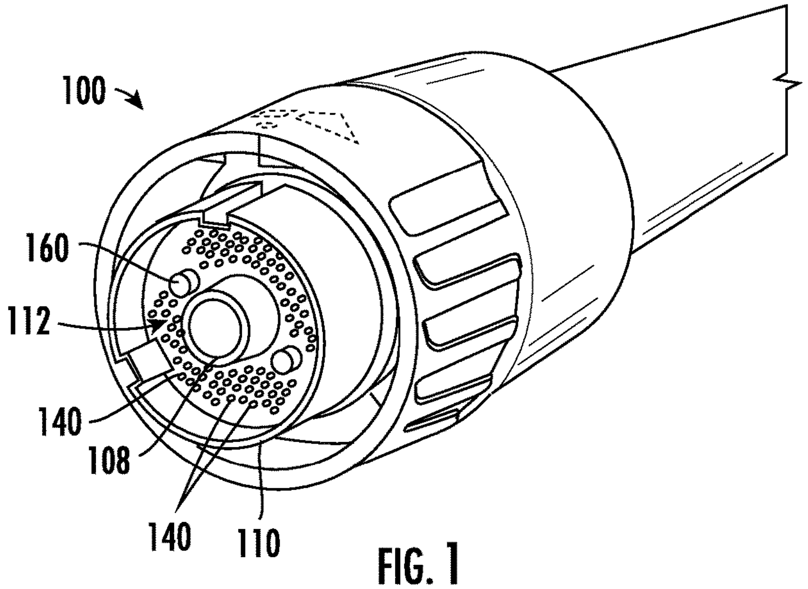
FIG. 1 is a front perspective view of an electrical connector according to an exemplary embodiment of the present disclosure.
Figure 2:
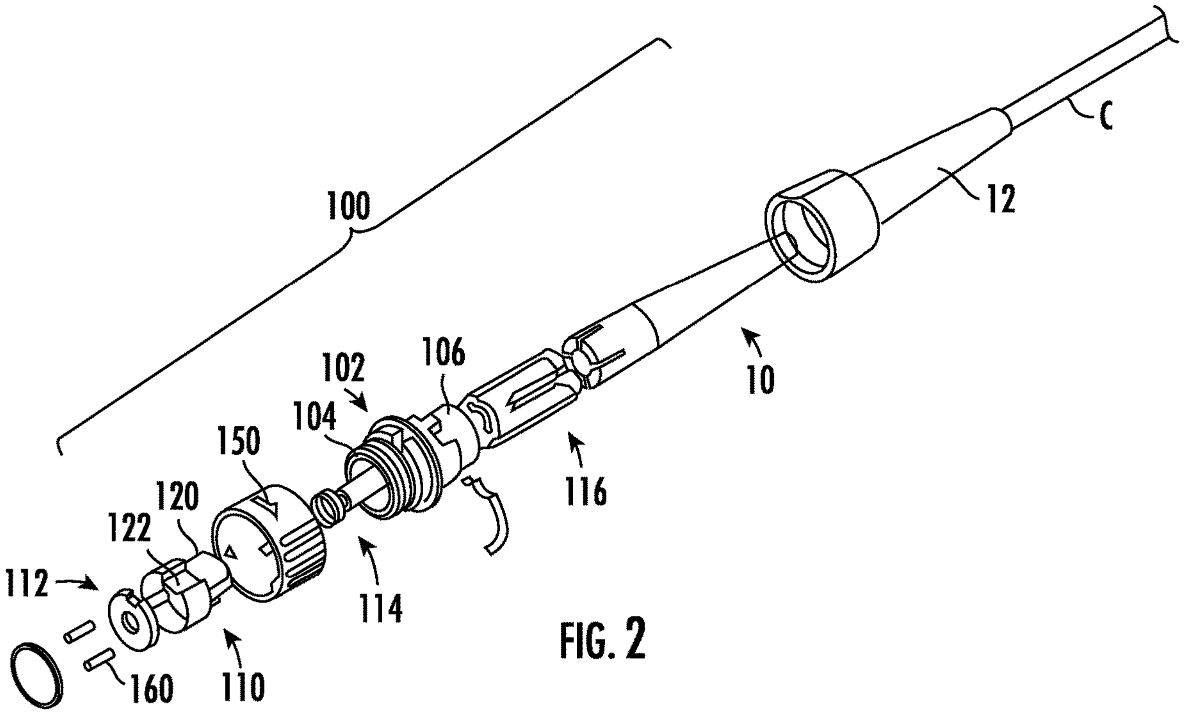
FIG. 2 is an exploded perspective view of the electrical connector illustrated in FIG. 1.

Referring to FIGS. 1-6, the present disclosure generally relates to an electrical connector 100, such as a high density electrical connector, that incorporates a spring-loaded core or contact carrier 110 (referred to generally as “contact carrier 110”) designed to provide positive electrical contact with a mating connector 200, thereby ensuring consistent signal integrity across the connector system, that is without intermittencies before or during use of the system. The contact carrier 110 is designed to allow over-travel to overcome the tolerance stack of the mated connector to ensure each of the contacts are fully engaged. Additionally, contact carrier 110 is configured to maintain an electrical connection between the connectors even if the respective mating faces are non-planar to each other during mating. In an embodiment, the contact carrier 110 of the electrical connector 100 is configured to cooperate with a double-sided contact interposer 112 to provide consistent electrical connection between the connectors 100, 200. Another advantage of the connector system of the present disclosure is that it may have an increased density, such as 1 mm pitch, and may be mated/unmated up to 5,000 times. Additionally, the connector systems of the present disclosure may provide for an increased high density of signal contacts at relatively low cost and that is reliable for up to 5,000 cycles. The design of the connectors of the present disclosure allows users to increase the signal count while keeping the same size connector and raw cable.

In general, the electrical connector 100 includes a housing 102 that slidably supports the contact carrier 110, a spring member 114 received in the housing 102 behind the contact carrier 110, an interposer 112 received in the contact carrier 110, and a contact member 116. The contact carrier 110 is configured to slide axially along a longitudinal axis of the housing 102 between an unmated position (FIG. 3), in which the contact carrier 110 is biased outwardly and ready to be mated with a mating connector 200, and a mated position (FIG. 4), in which the contact carrier 110 is pushed inwardly and compresses the spring member 114 and electrically engages the mating connector 200. The spring member 114 may be any biasing member, such as one or more wave springs or the like.

Figure 3:
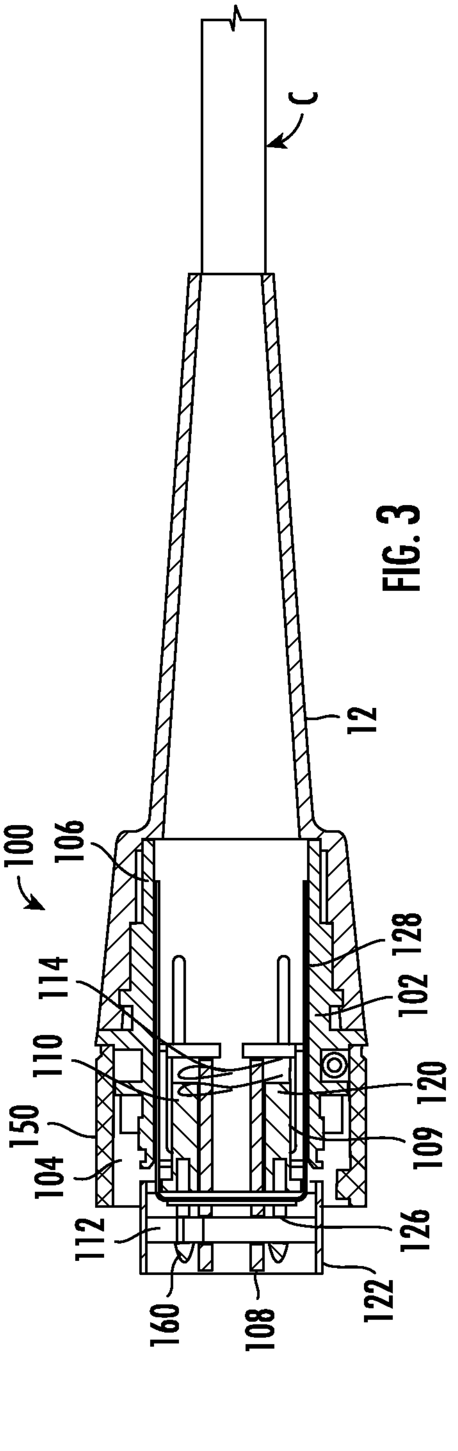
FIG. 3 is a cross-sectional view of the electrical connector illustrated in FIG. 1, showing a core or contact carrier of the electrical connector in an unmated position.
Figure 4:
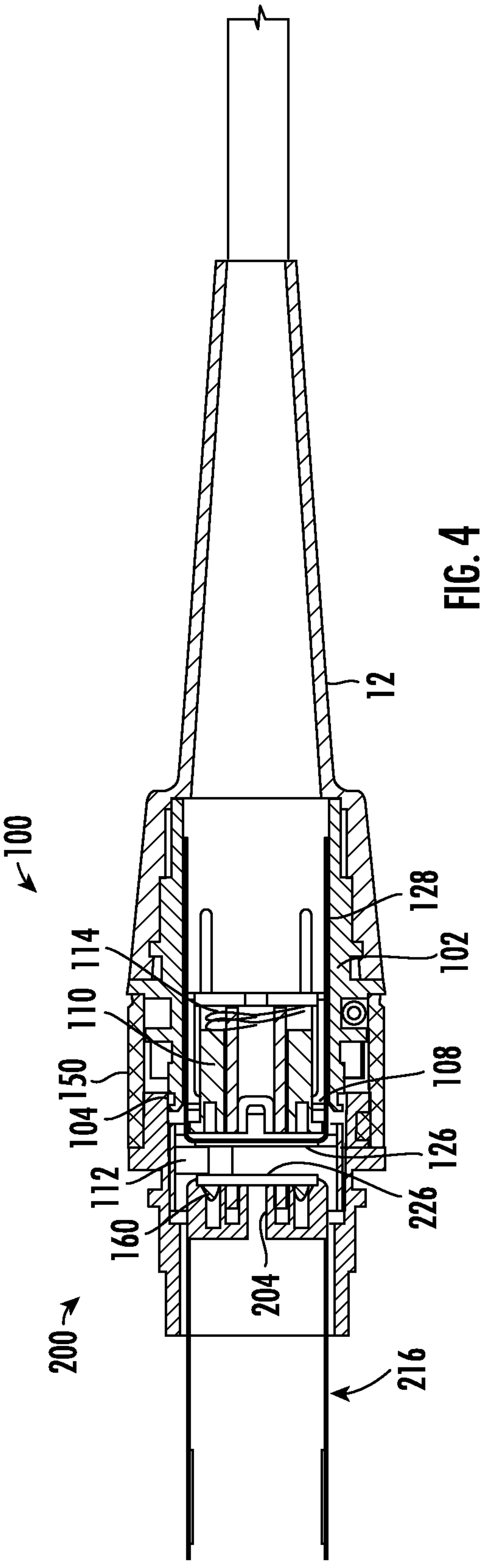
FIG. 4 is a cross-sectional view of the electrical connector illustrated in FIG. 1, showing the electrical connector mated to a mating connector and showing the core or contact carrier thereof in a mated position.

The housing 102 generally includes a mating interface end section 104 for interfacing with a mating end 202 of the mating connector 200, a cable termination end section 106 that is configured to receives a prepared end of a cable C, an inner support member 108 that slidably supports the contact carrier 110, and an inner receiving area 109 surrounding the inner support member 108 for receiving at least a portion of the contact carrier 110 and receiving the spring member 114 inside of the housing 102. The cable termination end section 106 may also be configured to receive a potting member 10 and a strain relief member 12, such as a boot, for a prepared end of the cable C. The inner support member 108 can be a longitudinally extending center post or barrel, as seen in FIGS. 3-4. The inner support member 108 may extend outwardly beyond the mating interface end section 104 such that a distal free end thereof may engage a corresponding component 204 of the mating connector 200 to provide stability to the connector system when the connectors 100, 200 are mated, as best seen in FIG. 4. In one embodiment, the inner support member 108 is hollow at a distal end to receive a corresponding component 204 of the mating connector 200, which may be a post sized to be insertable into the distal end of the inner support member 108.

The contact carrier 110 is mounted on and slides along the inner support member 108 of the housing 102 between unmated and mated positions. The contact carrier 110 may also be slidably attached to the housing 102, such as by snaps and the like. The contact carrier 110 generally includes a spring engagement end 120 that abutments the spring member 114 when the contact carrier 110 is compressed inwardly in the mated position, and a receiving end 122 that is sized and shaped to accept the interposer 112. The contact member 116 is mounted in a spring engagement end of the contact carrier 110 such that one end is adjacent the interposer 112 and the other end is near or at a cable termination end section 106 of the housing 102. The contact member 116 may be, for example, a flexible printed circuit board that has an end face 126 received in the contact carrier 110 that is configured to electrically engage the interposer 112 and a tail end 128 that connects to the cable C. The tail end 128 of the flexible printed circuit board is designed to allow for bucking due to the spring loaded movement of the contact carrier 110 along inner support member 108 between the unmated and mated positions.

Figure 6:
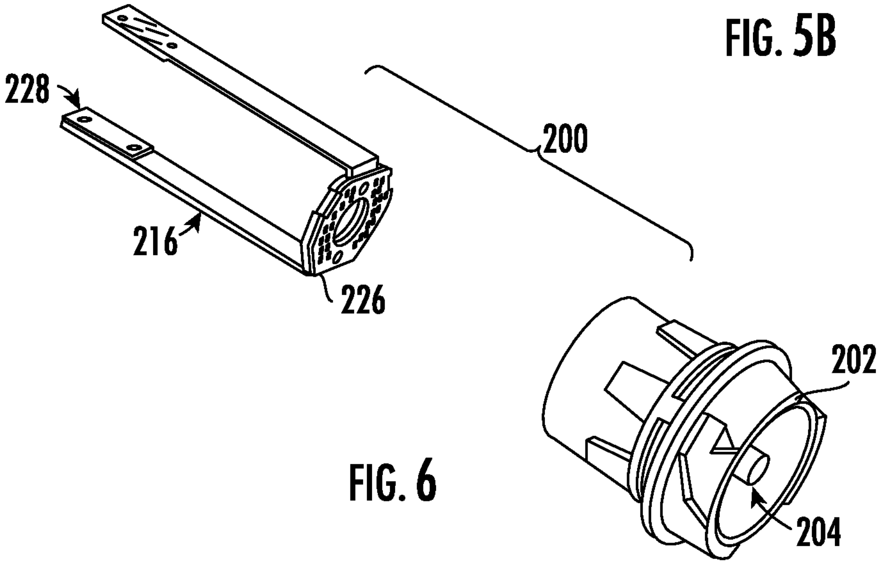
FIG. 6 is an exploded view of a mating connector that mates with the electrical connector illustrated in FIG. 1.
Figure 7A:
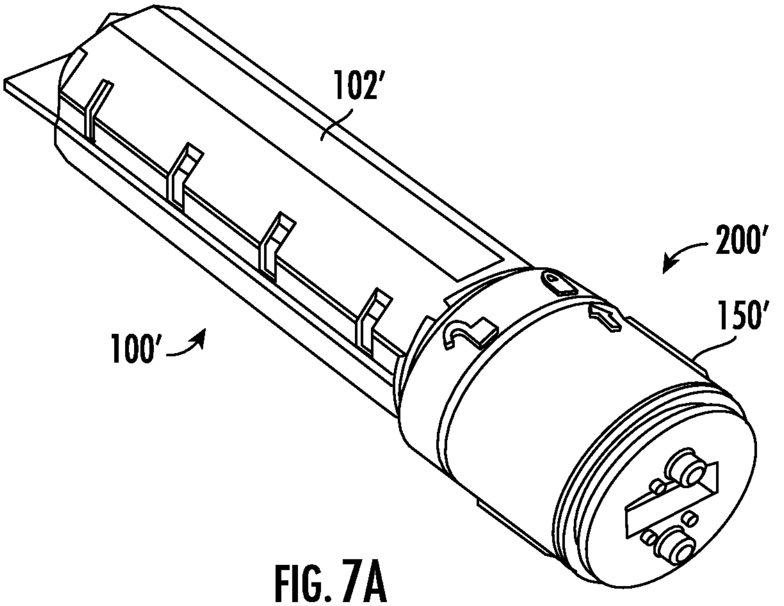
FIGS. 7A and 7B is a perspective and exploded views of a mated pair of electrical connectors in accordance with an alternative exemplary embodiment of the present disclosure, showing the electrical connectors assembled.
Figure 7B:
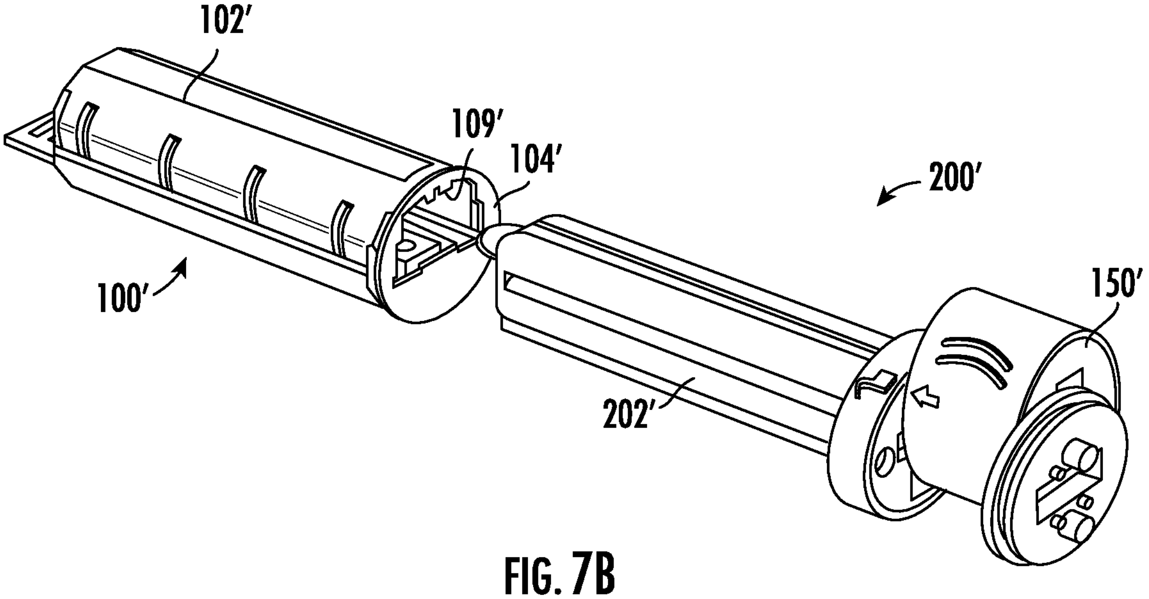

The interposer 112 includes at least one contact side 130 for electrically contacting the contact member 116, such as at the end face 126 thereof. In an embodiment, the interposer 112 is a double-sided contact interposer that has a second contact side 132 that is opposite the first contact side 130 and configured to electrically contact a contact member 216 of the mating connector 200. The contact member 216 of mating connector 200 may also be a flexible printed circuit board ("PCB") with an end face 226 and a tail end 228, as seen in FIG. 6, similar to the contact member 116. The end face 226 of the contact member 216 is configured to abut the second contact side 132 of the interposer 112. In accordance with embodiments of the present disclosure, the contact members may be a flexible or flex PCB, a rigid PCB, or a rigid-flexible or rigid-flex PCB. A rigid-flex PCB incorporates flexible materials in conjunction with rigid materials by layering flexible circuit substrates inside of the rigid circuit board materials, thus combining the versatility of flexible circuits with the stability, strength, and circuit routing densities of rigid PCBs.

Figure 5A:
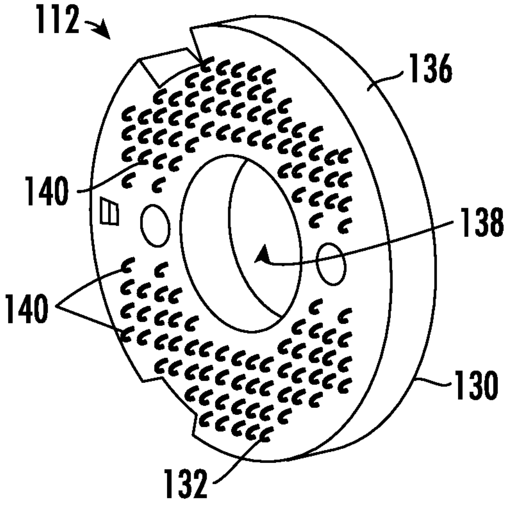
FIG. 5A is a perspective view of one side of an interposer of the electrical connector illustrated in FIG. 1.
Figure 5B:
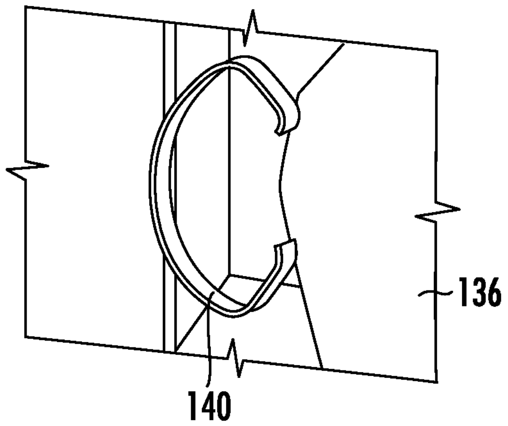
FIG. 5B is an enlarged view of an individual contact of the interposer illustrated in FIG. 5A.

In one embodiment, the interposer 112 has a wafer body 136 that may include a central opening 138 sized to receive the inner support member 108 of the housing 102. Each of the contacts sides 130, 132 of the interposer 112 may include a plurality of individual contacts 140, as seen in FIG. 5A, for electrical contact with the contact members 116, 216, respectively. The individual contacts 140 may be, for example, conductive C-clips, as seen in FIG. 5B, or the like. A biasing force of the spring member 114 can be higher than the mating force of each individual C-clip 140 loaded on the interposer 112 to provide overtravel of the contact carrier 110 beyond the full mating compression of the C-clips for consistent contact with the spring member 114. Such operation ensures full compression of the end face 126 of the contact member 116 on the individual contacts 140 so that the connector system, that is the mated connectors, will have consistent mating force because that force will be dictated by the spring member 114. The mating force of the connector system may be adjusted for use of different spring members. For example, the number of individual contacts 140 of the interposer 112 may be increased or decreased to increase or decrease, respectively, their biasing force where the biasing force of the spring member 114 can compensate for this increase or decrease in the biasing force of the contacts 140 to provide the overtravel of the contact carrier 110. As such, the connector system can be structured to have the minimum max insertion force that can be achieved with respect to a given number of contacts.

Once the connectors 100 and 200 are mated, a coupling member 150, such as a coupling nut, may be employed to latch the connectors together. The coupling nut 150 may be designed, for example, to be spring loaded so that the coupling nut 150 will auto-rotate and latches in place during installation. Although the coupling nut 150 is preferably used to latch the connectors 100, 200, any know latching mechanism and/or friction fit may be used to latch or secure the connectors 100, 200 together.

In one embodiment, the inner support member 108 and the corresponding component 204 of the mating connector 200 generally provide the gross-alignment of the connector system, while one or more alignment members 160, such as alignment pins, generally provide fine alignment of the connector system. The one or more alignment pins 160 may extend through the contact end face 226, the interposer 112, the contact end face 126, and into the contact carrier 110 to align the interposer 112, and particularly the individual contacts 140, with the end faces 126, 226, respectively, of the contact members 116, 216 of each of the connectors 100, 200. The alignment pins 160 may also extend through to the mating connector to ensure fine enough alignment between the connectors so that all contacts line up with a mating pad of the flex circuits.

FIGS. 7A-11 illustrate an alternative exemplary embodiment of the present disclosure. Specifically, FIGS. 7A-11 illustrate a connector 100' in accordance with an embodiment of the present disclosure. The connector 100' has a similar back-spring over-travel design, as described above. The connector 100' and a respective mating connector 200' each have interconnect features, similar to those described above, except that the engagement between the two connectors 100', 200' is in a direction generally perpendicular to the mating or longitudinal axis of the connector assembly. The design of the connector 100' advantageously provides a reduced outer diameter of the connector 100' while allowing for an extended length of the connector 100' for a higher density contact count. This may be particularly beneficial for hand-held applications in which a smaller outer diameter is preferred for a user to handle and operate the connector (e.g. to generally fit in a hand of a user), such as a catheter handle or the like.

Figure 8:
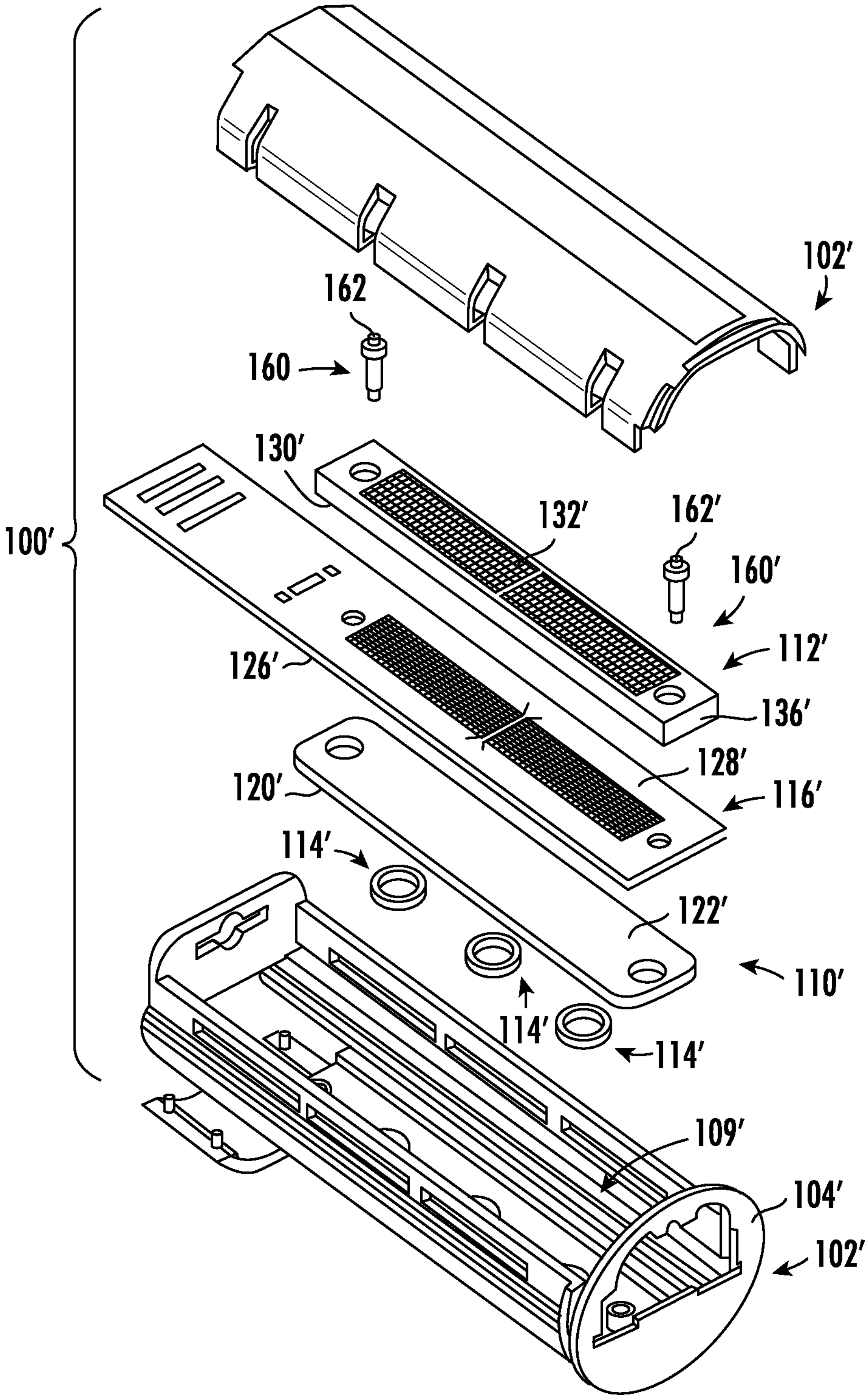
FIG. 8 is an exploded view of one of the electrical connectors illustrated in FIGS. 7A and 7B.

Like with the connector 100 described above with respect to FIGS. 1-6, the connector 100' of FIGS. 7A-11 generally includes a housing 102' that movably supports a contact carrier 110', a spring member or members 114' received in the housing 102' in association with the contact carrier 110', an interposer 112', and a contact member 116' supported by the contact carrier 110', as seen in FIG. 8. The connector 100' is designed such that the contact carrier 110' can move in the housing 102' in a direction perpendicular or substantially perpendicular to a longitudinal mating axis L of the connector assembly acting as an over-travel relief, between an unmated position (FIG. 10A), in which the contact carrier 110' is biased toward and ready to be electrically mated with the mating connector 200', and a mated position (FIG. 10B), in which the contact carrier 110' is compressed against the spring members 114' and electrically engages a contact member 216' of the mating connector 200'. The spring members 114' may be any biasing member, such as one or more wave springs, compression springs, elastic materials, or the like.

Figure 10A:
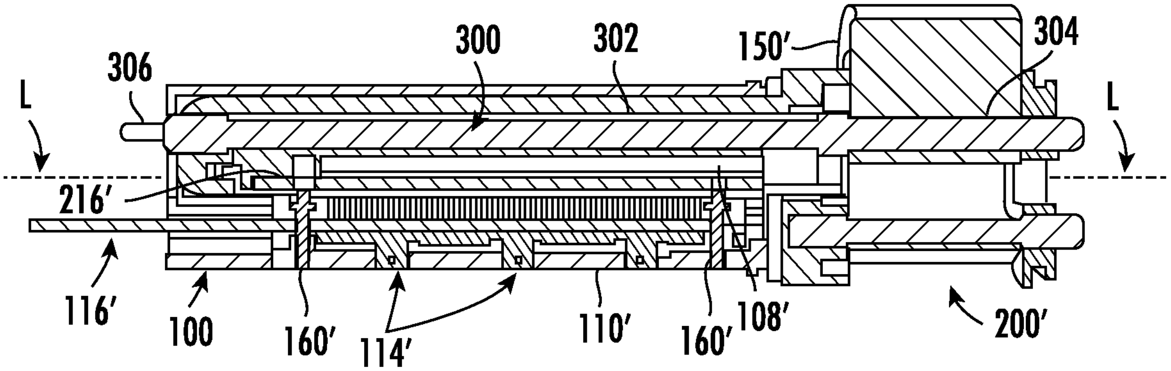
FIGS. 10A and 10B are cross-sectional views of the assembly of the electrical connectors of FIG. 7A, showing the unmated and mated electrical positions, respectively.
Figure 10B:
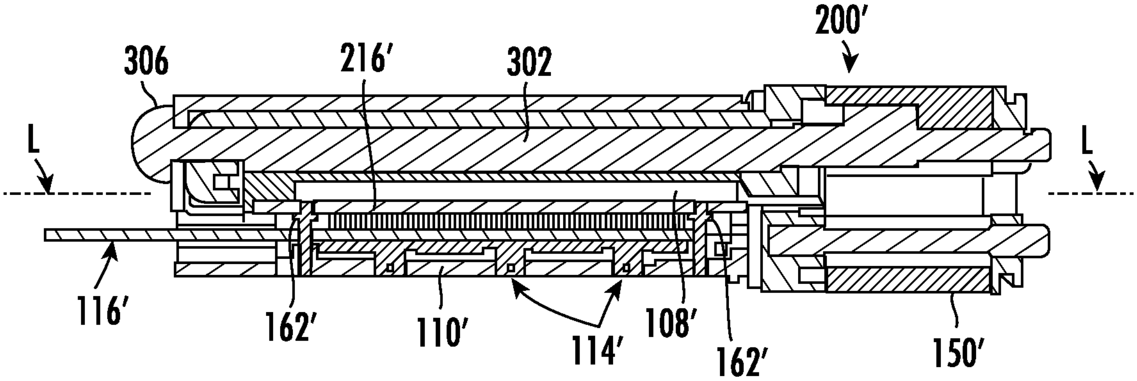

The housing 102' generally includes a mating interface end section 104' for interfacing with a mating end 202' of the mating connector 200', and an inner receiving area 109' for receiving the contact carrier 110', the interposer 112', and the spring members 114' inside of the housing 102'. The contact carrier 110' is mounted in the housing 102' and is movable between unmated and mated electrical positions, as seen in FIGS. 10A-10B. The contact carrier 110' generally includes a spring engagement portion 120' that is configured to couple with the spring members 114' when the contact carrier 110' is compressed in the mated position by the mating connector 200', and a receiving portion 122' that is configured to support the contact member 116' and the interposer 112'. The contact member 116' may be, for example, a flexible printed circuit board that has one face 126' that mounts on the receiving portion 122' of contact carrier 110' and an opposite face 128' configured to electrically engage the interposer 112'.

The interposer 112' is similar to the interposer 112 described in the embodiment of FIGS. 1-6. The interposer 112' includes a first contact side 130' for electrically contacting the contact member 116', such as at the face 126' thereof, and a second contact side 132' that is opposite the first contact side 130' and configured to electrically connect with the contact member 216' of the mating connector 200'. Similar to the interposer 112 of the embodiments of FIGS. 1-6, the interposer 112' of this embodiment may have a wafer body 136' and each of the contacts sides 130', 132' may include a plurality of individual contacts, such as conductive C-clips or the like. The biasing force of the spring members 114' can be higher than the mating force of each individual contact loaded on the interposer 112' to provide overtravel of the contact carrier 110' beyond the full mating compression of the individual contacts for consistent contact with the contact member 216'. This ensures full compression of the contact members on the individual contacts of the interposer 112' so that the connector system or assembly, that is the mated connectors, have a consistent mating force.

Figure 9A:
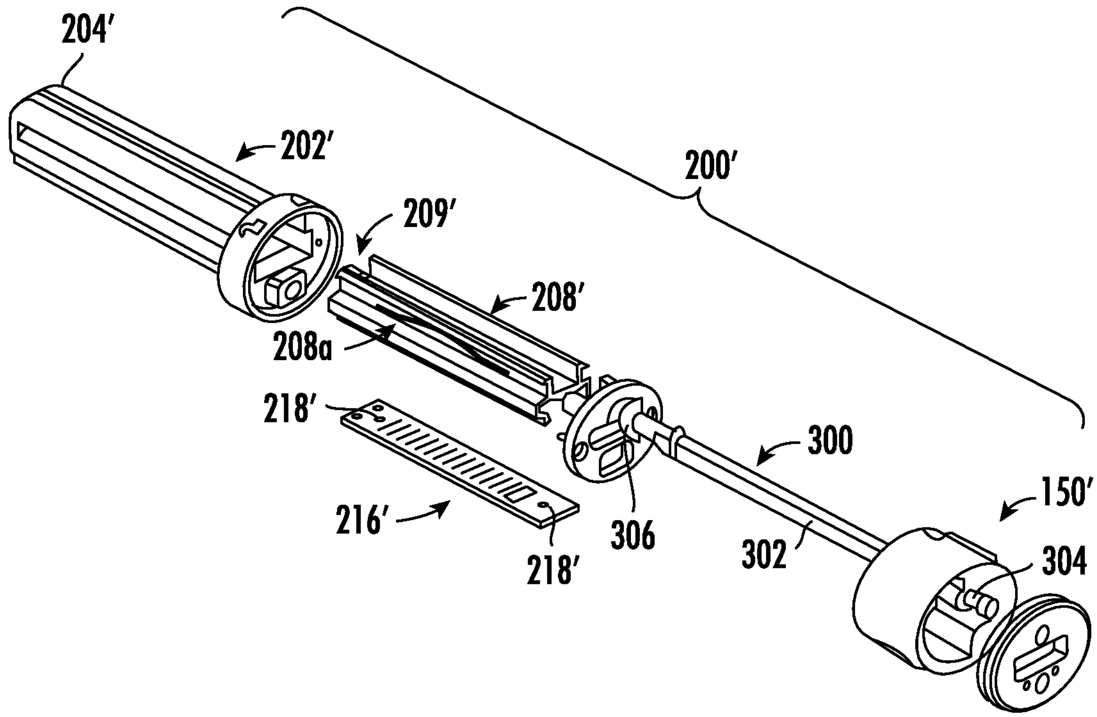
FIGS. 9A and 9B are exploded and perspective views of the other of the electrical connectors illustrated in FIGS. 7A and 7B.
Figure 9B:
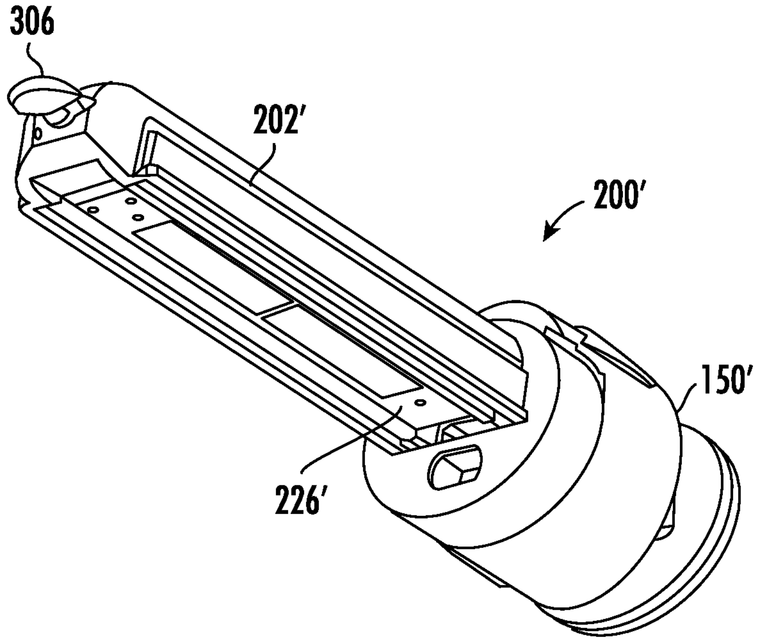

As seen in FIGS. 9A-9B, the mating connector 200' may have a housing 202' with an interface end 204' and a coupling nut 150' opposite thereof. The housing 202' includes an inner elevator support 208' that contains the second contact member 216'. The elevator support 208' is configured to move between a first position (FIG. 10A) and a second position (FIG. 10B) in concert with the unmated and mated electrical positions, respectively, of the contact carrier 110'. The elevator support 208' may be spring loaded in the unmated position by an elevator biasing spring **208*a*', for example, to prevent “crashing” during the gross alignment axial engagement with the mating connector 100' prior to electrical connection. The contact member 216' of the mating connector 200' may also be a flexible printed circuit board with a contact face 226' similar to contact member 116'**.

The connector 100' may be, for example, a receptacle and the mating connector 200' may be, for example, a plug, that inserts into the receptacle. Once the connectors 100', 200' are axially assembled, that is the interface end 204' of the connector 200' (e.g., plug) is received in the housing 102' of connector 100' (e.g., receptacle), a latching mechanism may be activated to complete and secure the electrical connection between the receptacle and the plug. The latching mechanism is designed to move the contact member 216' of the plug toward the interposer 112' of the receptacle in a direction substantially perpendicular to the axis of plug to receptacle mating.

In one embodiment, the latching mechanism may comprise a cam member 300 supported by the plug and that is rotatable between inactive and active positions. The cam member 300 may comprise an elongated stem 302 having one end 304 connected to the coupling nut 150' of the plug and an opposite lock end 306. The elongated stem 302 may be generally flat, that is it may be wider than it is thick, such that when the cam member 300 is rotated a predetermined number of degrees, e.g., 90 or about 90 degrees, from an inactive position (FIG. 10A) to an active position (FIG. 10B), the stem 302 will force the elevator support 208' of the plug, which supports the contact member 216' of the plug, from a first position toward the interposer 112' of the receptable (e.g., downward on the page in FIGS. 10A-10B) to a second position. That is, when the coupling nut 150' is turned, the cam member 300 activates to move the contact member 216', via the elevator support 208', from an unmated electrical position toward the mating receptacle contact system to a mated electrical position, thereby electrically connecting the plug and the receptacle. In that position, the lock end 306 locks or abuts against the housing 202' of the plug.

Figure 11:
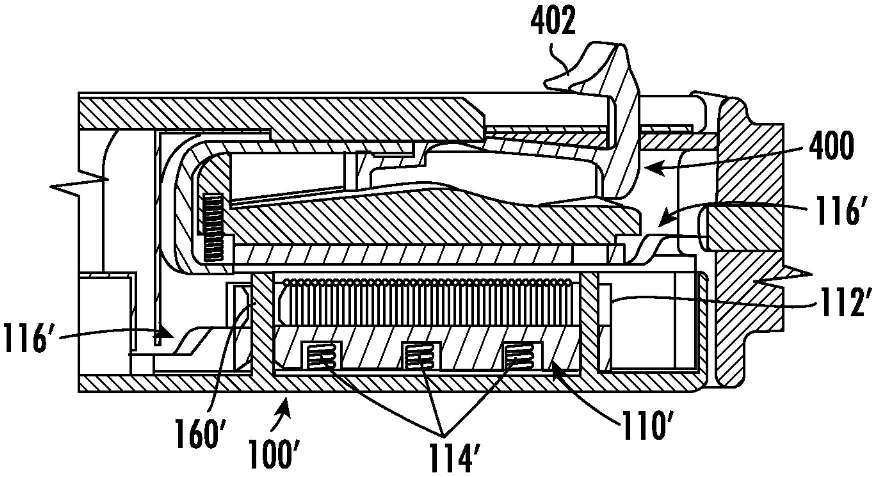
FIG. 11 is a cross-sectional view of the assembly of an electrical connector assembly according yet another exemplary embodiment of the present disclosure.

The latching mechanism may alternatively be a slide latch member 400, as seen in FIG. 11. The slide latch member 400 is configured to slide between inactive and active positions. That is, when the slide latch member is moved from the inactive position and slid to the active position, the elevator support 208' of the plug is forced from a first position toward the interposer 112' of the receptable to a second position, thereby moving the contact carrier 110' from an unmated electrical position to a mated electrical position to electrically connect the contact member 216' of the plug with the interposer 112' of the receptable. The slide latch member 400 may have a feature 402, such as a snapping feature, that is configured to prevent premature mating of the components prior to plug/receptacle assembly. In this embodiment, the receptacle 100' may push the feature 402 out of interference within the plug 200', thereby allowing the slide latch member 400 to be engaged.

In yet another embodiment, the latching of the plug into the receptacle when fully seated may be provided such as, a friction fit, spring clip latch, or locking latching mechanism. The latching mechanism may incorporate a latch activation release system configured to prevent the contact system coupling nut from being activated without engagement of the plug and receptacle. Such configuration would ensure that the plug and receptacle will seat without damage to the plug contact system. A spring loaded mechanism, such as a spring probe, may be included in the interface end 204' of the plug which can prevent the cam member 300 from being activated/turned by the user because of interference with the interface end 204' of the cam member 300 (which also acts as a locking feature to the receptacle when engaged and activated). Once the interface end 204' of the plug is fully bottomed into the receptacle, the spring loaded mechanism may be depressed out of the way from the cam member 300, thereby allowing a user to rotate the coupling nut 150', which engages the plug contact system to the receptacle contact system and, additionally, latches the plug to the receptacle so that it cannot be disengaged unless decoupled by the user manually by rotating the coupling nut 150' back to the unactivated state to mating.

In an embodiment, the coupling nut 150' may be spring loaded in a locked position or state. The coupling nut 150' may have mating orientation features, such as extruded bosses, which are configured to engage corresponding receptacle mating features, such as extruded bosses, which rotate the coupling nut 150' into an unlocked position or state during mating. As the receptacle and plug are being assembled together, the coupling nut 150' may include orientation features that overcome the receptacle orientation features and latch into place. As such, the latching, via the latching mechanism, and the electrical engagement between the components is simultaneous or near simultaneous.

In another embodiment, the coupling nut 150' is configured to utilize mating orientation features that correspond to mating orientation features on the receptacle, similar to the above; however the latching and electrical engagement may not be simultaneous. After initial assembly of the receptacle and plug, the coupling nut 150' may be rotated toward a lock direction which cams the contact system of the plug (e.g., the elevator support 208' and contact member 216'), into the mating receptacle contact system (e.g., the interposer 112'), thereby fully engaging the electrical engagement and the overtravel springs 114'. This allows the user to overcome high axial mating forces by utilizing the latching mechanism, such as the cam member 300, for a mechanical advantage.

One or more alignment pins 160, 160' may be provided in the housing 102' of the receptable to facilitate alignment with the connector system of the plug when the latching mechanism, such as the cam member 300, is actuated to complete electrical coupling of the receptacle and the plug. The pins 160, 160' may extend through the contact carrier 110', the contact member 116', and into the interposer 112', leaving the ends 162, 162' thereof ready for engagement with the contact member 216' of the plug, as seen in FIG. 10A. The contact member 216' of the plug may include holes 218' that correspond to the alignment pins 160, 160' of the receptable such that when the latching mechanism is actuated, the holes 218' of the plug receive the ends 162, 162' of the alignment pins 160, 160', for proper fine alignment and contact line up of the interposer 112 of the receptable with the contact member 216' of the plug. Alternatively, the alignment pins may be provided in the plug 200' which engage corresponding holes in the receptacle 100'.

While particular embodiments have been chosen to illustrate the disclosure, it will be understood by those skilled in the art that various changes and modifications can be made therein without departing from the scope of the disclosure as defined in the appended claims. A method to prevent the contact system coupling mechanism from being activated without engagement of the plug and receptacle may be incorporated. This would ensure that the plug and receptacle will be able to seat without damage to the contact system or interposer. A spring loaded mechanism, such as a spring probe 209', may be included in the interface end 204' of the plug which can prevent the cam member 300 from being activated/turned by a user because of interference with the interface end 204' of the cam member (which also acts as a locking feature to the receptacle when engaged and activated). Once the interface end 204' of the plug is fully bottomed into the receptacle, the spring loaded mechanism may be depressed out of the way from the cam member 300 by a mating feature in the receptacle, thereby allowing the user to rotate the coupling nut 150', which engages the plug contact system to the receptacle contact system and, additionally, latches the plug to the receptacle so that it cannot be disengaged unless decoupled by the user manually by rotating the coupling nut 150' back to the unactivated state.

During installation and/or joining and separating the two components, the contacts (e.g., contact member 216, 216') may be exposed. As such, a user may inadvertently touch the contacts when the connectors (e.g., connectors 100, 200 or 100', 200') are separated from each other. Specifically, in the configuration of FIGS. 7A-11, the contact member 216' may be exposed and contact therewith is possible. To prevent such contact by a person (e.g., finger or the like), in accordance with some embodiments of the present disclosure, a contact barrier is provided to automatically protect the contact member(s) when the connectors are separated from each other.

Figure 12A:
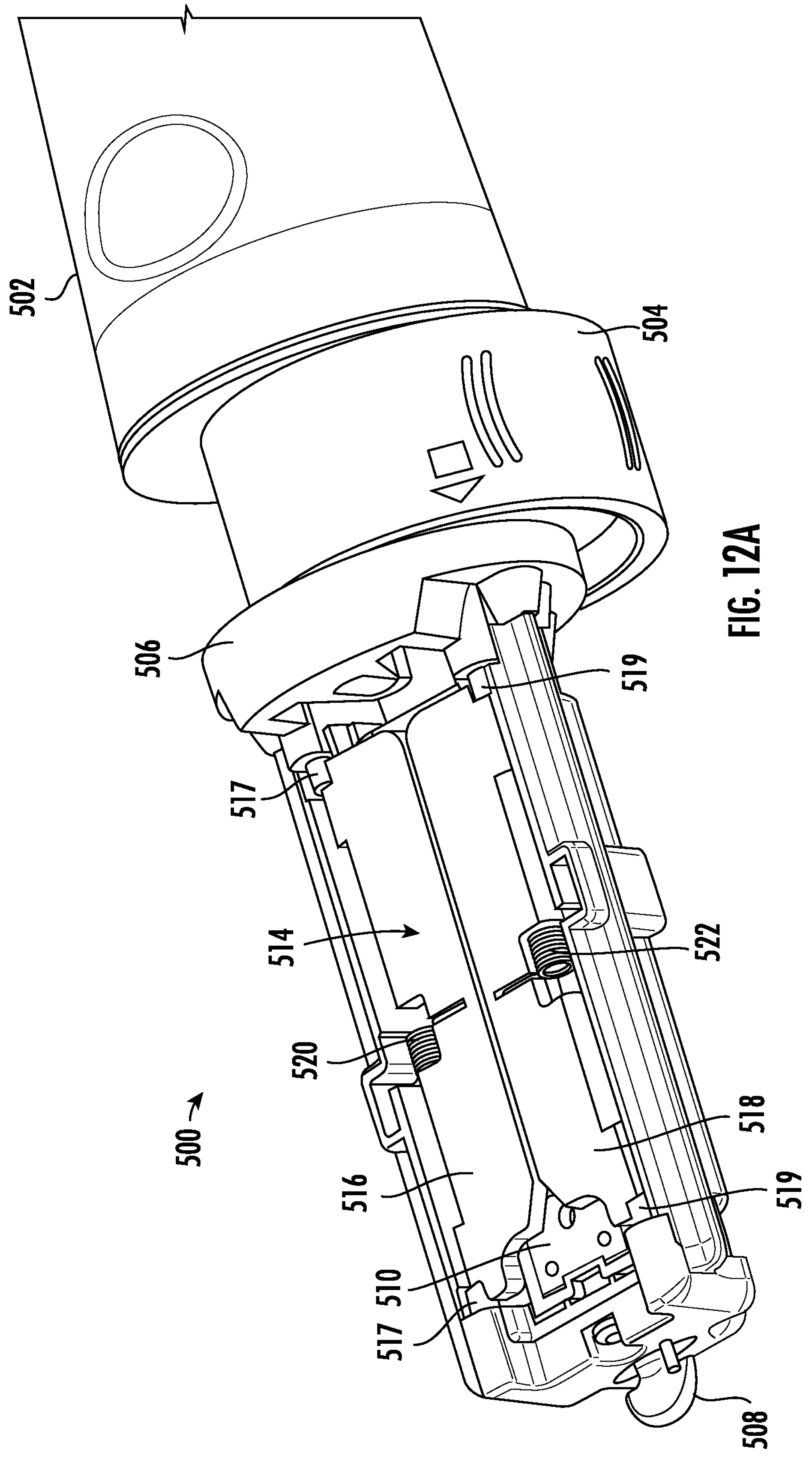
FIG. 12A is a schematic illustration of a part of a connector assembly in accordance with an embodiment of the present disclosure, illustrating a closed state of a contact barrier.
Figure 12B:
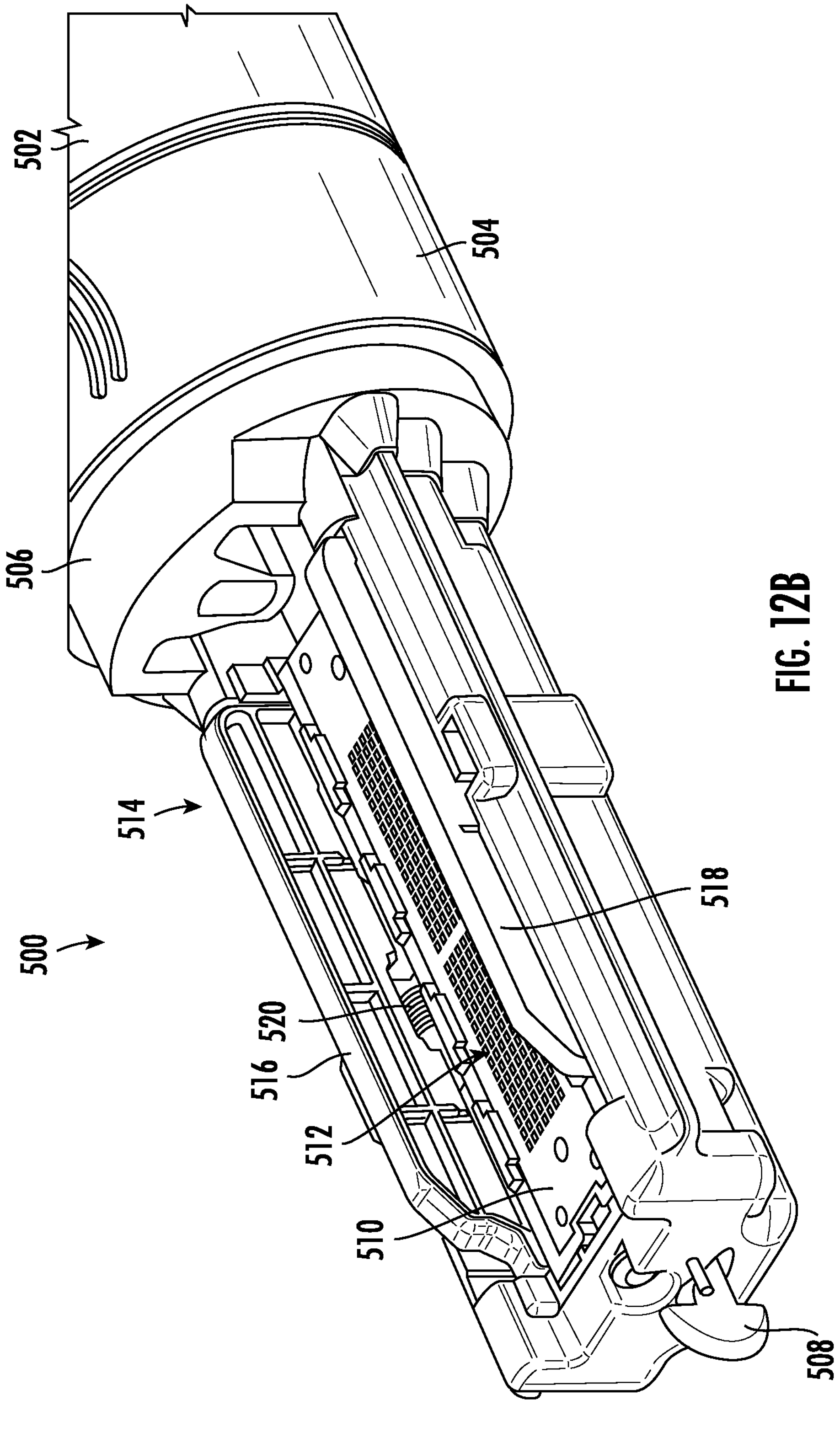
FIG. 12B is a schematic illustration of the connector assembly of FIG. 12A, illustrating the open state of the contact barrier.

For example, referring now to FIGS. 12A-12B, schematic illustrations of a connector assembly in accordance with an embodiment of the present disclosure are shown. The connector assembly includes a connector 500 (e.g., similar to the mating connector 200') that is configured to removably engage with a mating connector (e.g., similar to the connector 100'). The connector 500 includes a boot 502, a coupling nut 504, and a housing 506 assembled to form the connector 500. The boot 502 is configured to connect to or provide connection to and protection to a cable or the like (e.g., as shown in FIGS. 1-4). The coupling nut 504 is arranged to be manually operated as described above (e.g., as described with respect to FIGS. 7A-11). The coupling nut 504 is configured to operate in concert with a lock end 508, as described above. The coupling nut 504 may be rotatable between a locked position or state (FIG. 12B) and an unlocked position or state (FIG. 12A).

The housing 506 supports and houses a contact member 510 that includes one or more electrical contacts 512 thereon. The electrical contacts 512 may be pins or the like and may be sensitive to liquids, oils, or unintentional mechanical or physical contact that can damage or otherwise impact the functionality of the connector 500. To prevent unintentional mechanical or physical contact with the electrical contacts 512, the connector 500, as shown in FIGS. 12A-12B, includes a protective cover or the like, such as, but not limited to, a contact barrier 514. FIG. 12A illustrates the contact barrier 514 in a closed (protective) state and FIG. 12B illustrates the contact barrier 514 in an open (exposed) state. The closed state is a default or normal position of the contact barrier 514, such as when the connector 500 is not connected to or engaged with another mating connector. However, when the connector 500 is inserted into and engaged with a mating connector, the contact barrier 514 will transition to the open state to expose the electrical contacts 512 and enable electrical connection between and through the mated connectors. That is, the contact barrier 514 is movable (e.g., openable, slidable, transitionable, actuatable, etc.) from the closed state to the open state during joining of the connectors.

As shown in the embodiment of FIGS. 12A-12B, the contact barrier 514 comprises a first panel 516 and a second panel 518. In this embodiment, the panels 516, 518 are biased and rotatable about a hinge to open and close (see, for example, hinge 517 of the first panel 516 and hinge 519 of the second panel 518). For example, as shown, the first panel 516 includes a respective first biasing member 520 that biases the first panel 516 into the closed position (FIG. 12A). Similarly, the second panel 518 includes a respective second biasing member 522 that biases the second panel 518 into the closed position (FIG. 12A). As such, the default or normal arrangement of the panels 516, 518 is the closed position (FIG. 12A). To open the panels 516, 518, an external force (e.g., actuation operation) must be provided to urge the panels to open and expose the electrical contacts 512 of the contact member 510 (e.g., as shown in FIG. 12B).

Figure 13A:
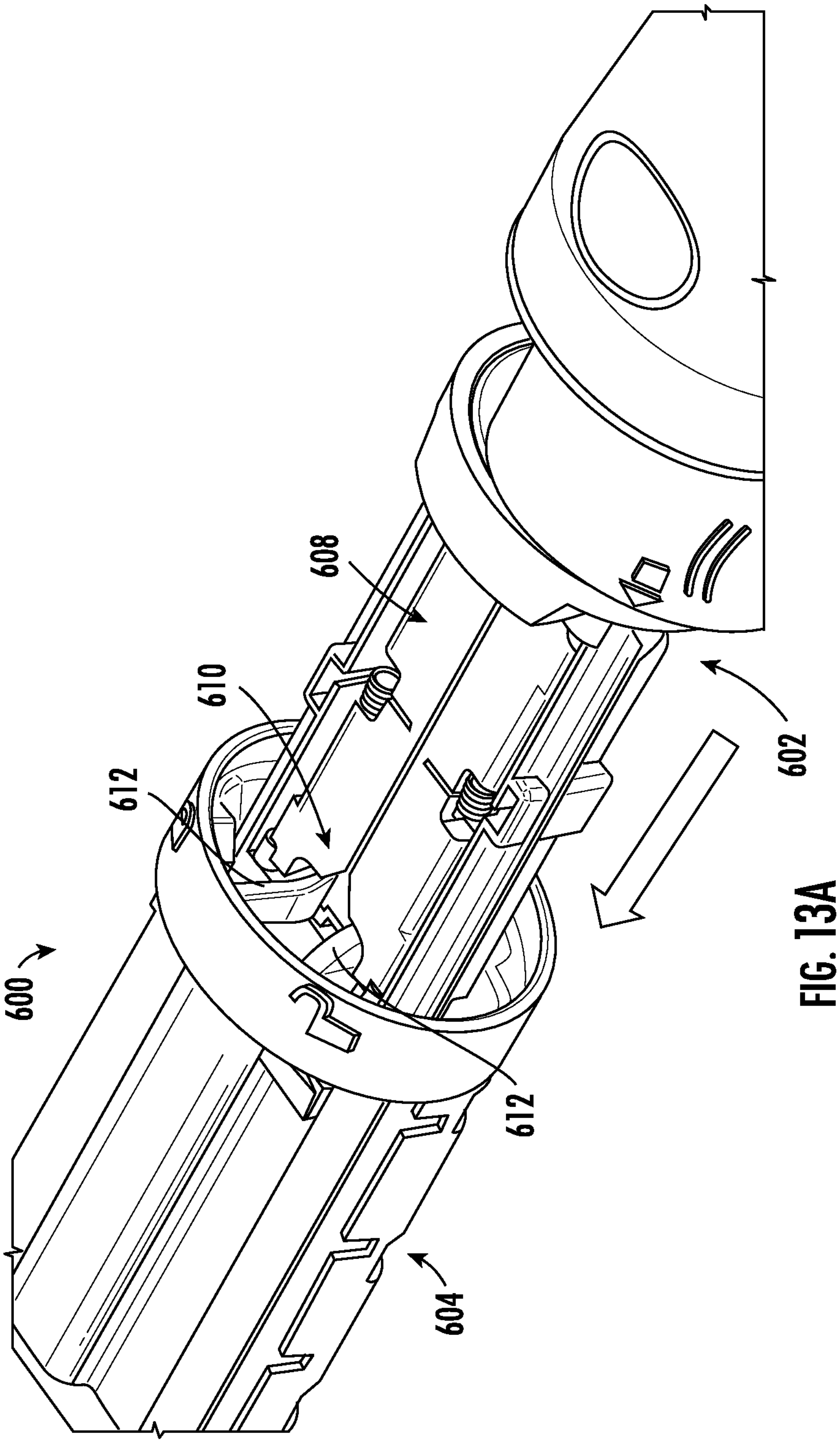
FIG. 13A is a schematic illustration of a part of a connector assembly in accordance with an embodiment of the present disclosure, illustrating a closed state of a contact barrier during assembly of the connector assembly.
Figure 13B:
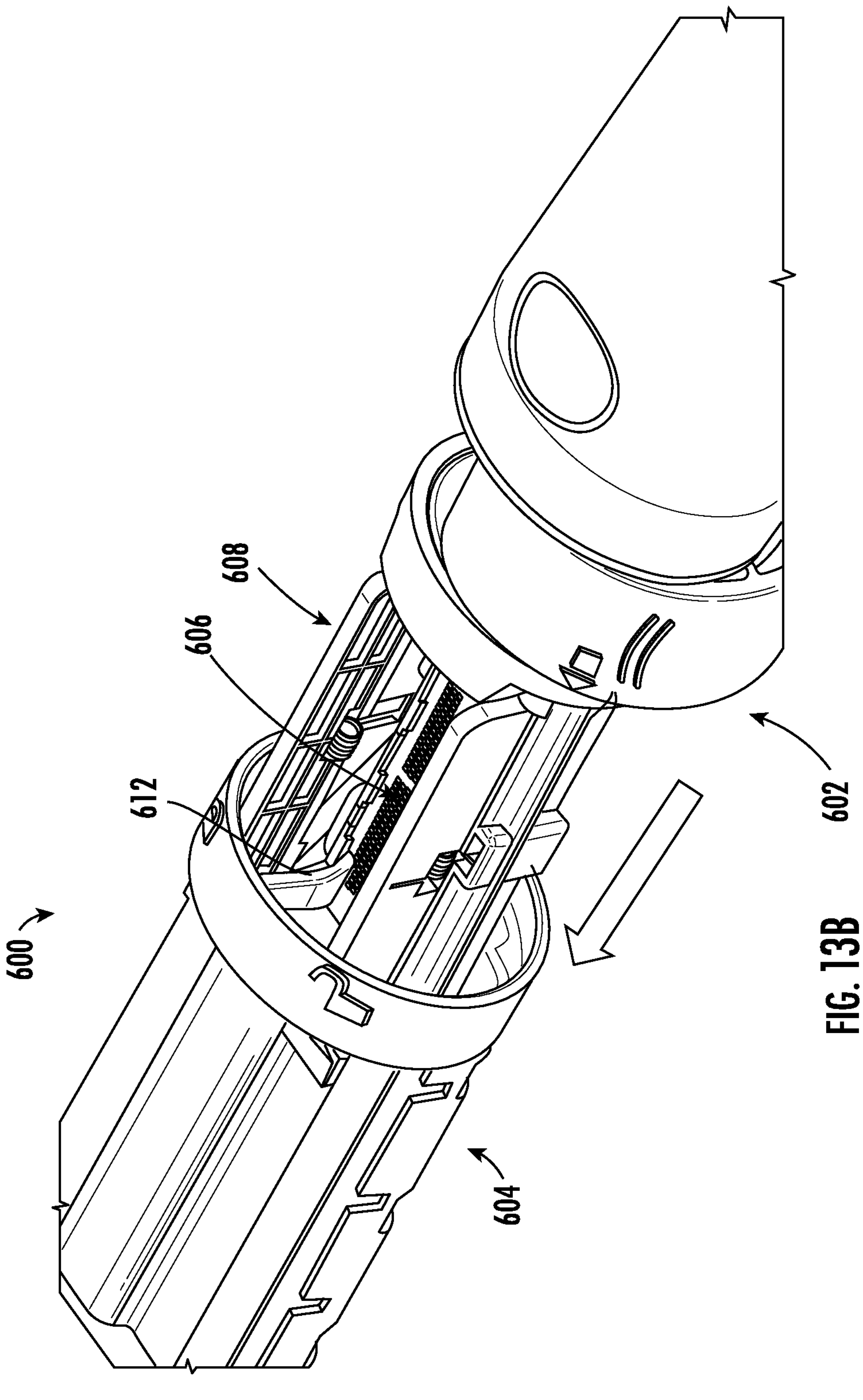
FIG. 13B is a schematic illustration of the connector assembly of FIG. 13A, illustrating the open state of the contact barrier as the connector assembly is assembled.

Referring now to FIGS. 13A-13B, schematic illustrations of a connector assembly 600 in accordance with an embodiment of the present disclosure are shown. The connector assembly 600 includes a first connector 602 (e.g., similar to the mating connector 200', 500) that removably engages with a second connector 604 (e.g., similar to the connector 100'). The first connector 602 includes a boot, a coupling nut, and a housing assembled to form the first connector 602, similar to that shown and described above. In this illustrative embodiment, the first connector 602 that releasably engages and connects with the second connector 604 to provide an electrical connection through the connector assembly 600. The first connector 602 includes a contact member 606 that is selectively protected by a contact barrier 608. In this embodiment, the contact barrier 608 is a two-panel configuration similar to that shown and described with respect to FIGS. 12A-12B. The contact barrier 608 is normally biased into a closed position (FIG. 13A) and may be urged into an open position (FIG. 13B) during insertion of a portion of the first connector 602 being installed within the second connector 604.

To cause opening of the panels of the contact barrier 608, the contact barrier 608 may include one or more first engagement features 610. The first engagement features 610 are structures, surfaces, or the like that aid in the transition of the contact barrier 608 from a closed state to an open state. The second connector 604 includes one or more second engagement features 612 that interact with the first engagement features 610 to cause opening of the contact barrier 608 as the first connector 602 is inserted into the second connector 604. In this illustrative embodiment, the first engagement features 610 of the contact barrier 608 are angled or chamfered surfaces on the contact barrier 608 at an end that is at a forward or engagement end of the first connector 602. As the first connector 602 is inserted into the second connector 604, the first engagement features 610 will engage and interact with (e.g., contact) the second engagement features 612 of the second connector 604, thus causing the contact barrier 608 to be urged from the closed state to the open state.

In this illustrative embodiment, the first engagement features 610 are angled surfaces on the ends of each of the panels of the contact barrier 608. The contact barrier 608 has two panels in this configuration, and thus the second connector 604 includes two second engagement features 612, with one engagement feature 612 for each panel of the contact barrier 608. In other embodiments, the two separate second engagement features may be arranged as a single structure, such as a wedge or the like, that interacts with both panels of the contact barrier 608 simultaneously. Because the second engagement features 612 will open the contact barrier 608 only when the connectors 602, 604 are connected and the contact barrier is normally biased in the closed position, the electrical contacts of the contact member 606 may be protected when the first connector 602 is not arranged in connection with the second connector 604.

Although the second engagement features 612 are illustratively shown as a static structural element of the second connector 604 (e.g., protrusion or rib), various other configurations are possible without departing from the scope of the present disclosure. The second engagement features may include passive and active structures or components that cause actuation, operation, or transitioning of the contact barrier from a closed (protective) state to the open state. Actuation may include passive and active mechanisms, such as and without limitation, barriers/doors that are rotated by an additional rotational collar (e.g., manual operation), hall-effect sensors, electronic actuators, magnetic actuators, proximity switches, or the like that may trigger in response to two or more components or elements becoming in contact and/or close proximity to each other, thus energizing an actuation (e.g., spring or piston or the like) that causes the doors/barriers to move from one state or position to another. In accordance with embodiments, the actuation of the contact barrier to transition from the closed state to the open state is automatic such that the act of joining the two connectors causes the actuation of the contact barrier to expose the electrical contacts and allow the electrical connections described herein.

Although the above described and illustrated embodiments have a contact barrier in the form of two hinged or pivoting panels, those of skill in the art will appreciate that other types of contact barriers are possible to be employed without departing from the scope of the present disclosure. For example, single panel configurations that are hinged on a single side and covers the entire contact member may be used. In other single-panel configurations, the hinge may be arranged to cause the open-close operation to be perpendicular to an axis of the connector rather than parallel to an axis of the connector. In some configurations, instead of a hinged configuration, a sliding or rolling configuration may be employed without departing from the scope of the present disclosure.

Figure 14:
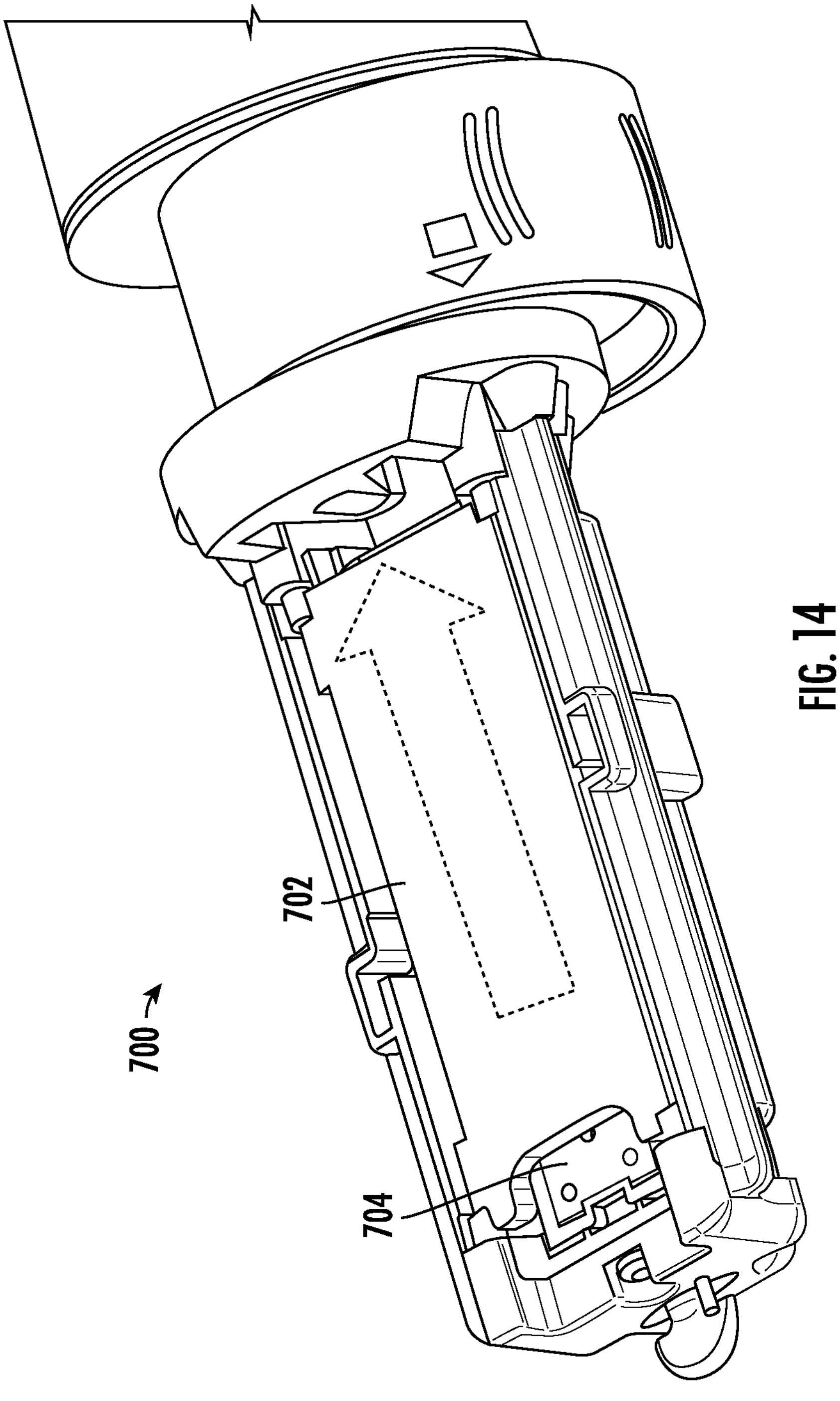
FIG. 14 is a schematic illustration of a connector assembly having a contact barrier in accordance with an embodiment of the present disclosure.

For example, turning to FIG. 14, a schematic illustration of a connector 700 in accordance with an embodiment of the present disclosure is shown. The connector 700 may be similar to the first connector of the embodiment of FIGS. 13A-13B or the connector of FIGS. 12A-12B. In this embodiment, the connector 700 includes a contact barrier 702 arranged to protect a contact member 704 that includes a plurality of electrical contacts that are desired to be protected when the connector is not connected to a mating connector. In this embodiment, the contact barrier 702 axially slides into the connector 700 or is slidingly moveable as the connector 700 is inserted into a mating connector. The contact barrier 702 will contact an engagement feature of the mating connector and be urged in an axial translation to slide into the connector 700 and expose the electrical contacts of the contact member 704 for electrical connection with the mating connector.

Figure 15:
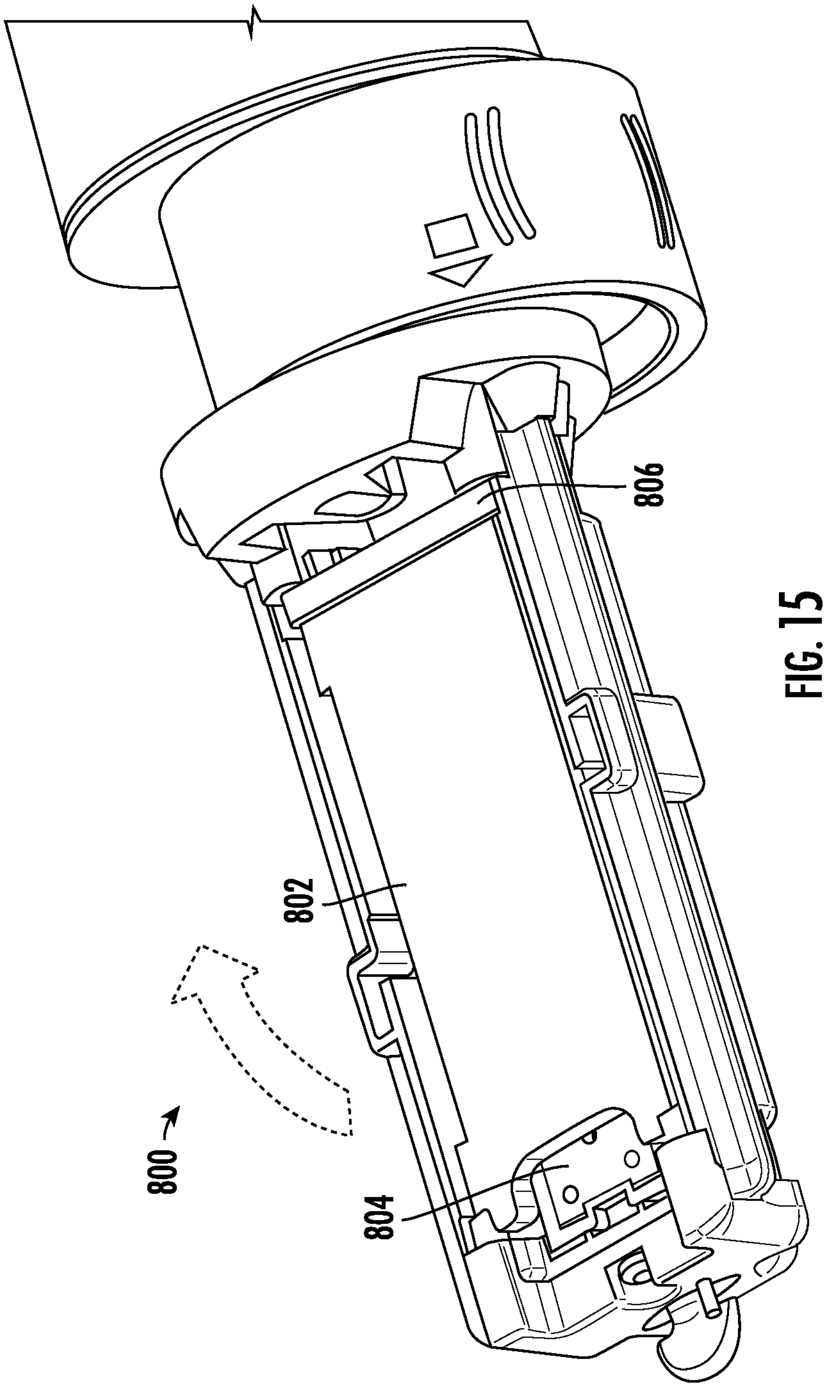
FIG. 15 is a schematic illustration of a connector assembly having a contact barrier in accordance with an embodiment of the present disclosure.

Turning to FIG. 15, a schematic illustration of a connector 800 in accordance with an embodiment of the present disclosure is shown. The connector 800 may be similar to the connectors described above having a contact barrier 802. In this embodiment, the connector 800 includes the contact barrier 802 arranged to protect a contact member 804 that includes a plurality of electrical contacts that are desired to be protected when the connector is not connected to a mating connector. In this embodiment, the contact barrier 802 pivots or rotates about a hinge 806 as the connector 800 is inserted into a mating connector. The contact barrier 802 will contact an engagement feature of the mating connector and be urged in a rotation about the hinge 806 to open the contact barrier 802 and expose the contact member 804. In this embodiment, due to the length of the contact barrier 802, when the connector 800 is engaged with a mating connector, the contact barrier 802 may extend outward from a side of the connected assembly.

Figure 16:
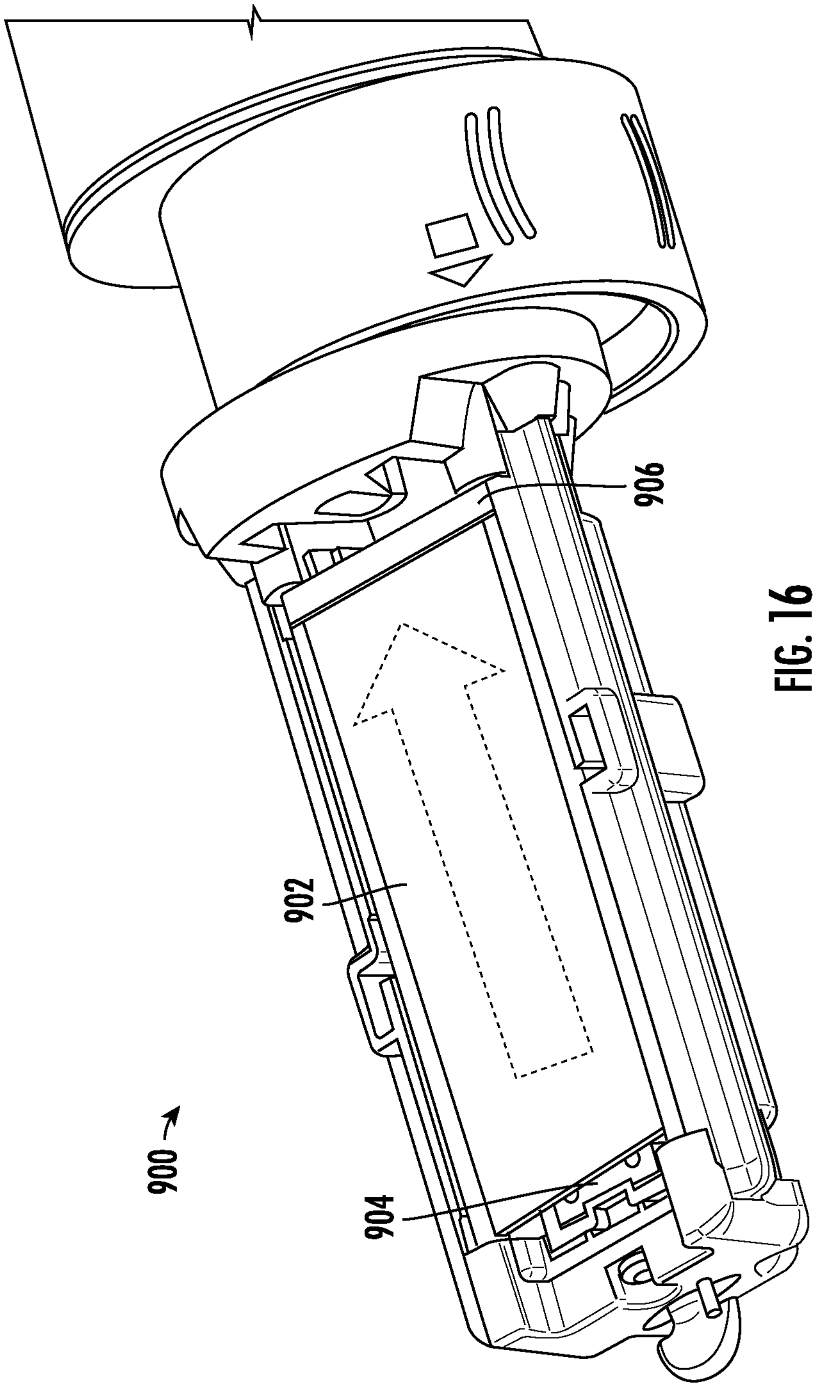
FIG. 16 is a schematic illustration of a connector assembly having a contact barrier in accordance with an embodiment of the present disclosure.

Turning to FIG. 16, a schematic illustration of a connector 900 in accordance with an embodiment of the present disclosure is shown. The connector 900 may be similar to the connectors described above having a contact barrier 902. In this embodiment, the connector 900 includes the contact barrier 902 arranged to protect a contact member 904 that includes a plurality of electrical contacts that are desired to be protected when the connector is not connected to a mating connector. In this embodiment, the contact barrier 902 rolls up or is wound about a spool 906 as the connector 900 is inserted into a mating connector. The contact barrier 902 will contact an engagement feature of the mating connector and be urged in an axial sliding and be rolled or wound about the spool 906 to expose the electrical contacts of the contact member 904 for electrical connection with the mating connector.

The embodiments illustrated in FIGS. 12A-16 provide examples of types of contact barriers in accordance with the present disclosure. These examples are provided for illustrative and explanatory purposes and are not intended to be limiting to the specific arrangement, configurations, and methods of operation. Other types of contact barriers and/or mechanisms of operating such contact barriers are contemplated by the scope of the present disclosure. A feature of the contact barriers described herein is that such contact barriers are normally closed except when the associated connector is inserted into a mating connector and the contact barrier is urged against the biasing-closed-force to open the contact barrier and expose electrical contacts for engagement with electrical contacts of the mating connector. The contact barriers of the present disclosure may be formed from any desirable material but may preferably be formed from a non-conductive material which may be a rigid or semi-rigid material. In some non-limiting configurations, the contact barriers may be made from metal(s), metal having a coating, thermoplastic, mylar, rubber, plastic; PCB-board materials (e.g., resin/epoxies), or other materials. In some configurations that employ metal contact barriers, the metal of the contact barriers can be arranged to provide an additional grounding path therethrough or grounding properties to the system (e.g., for grounding static electric discharge). The material is selected to provide a structural, mechanical, and/or physical obstruction that prevents a finger or other object to contact the electrical contacts of the connector. Accordingly, in accordance with some embodiments of the present disclosure, the electrical contacts of a connector may be protected from damage, debris, or contact from a user, and thus the product life of such connectors may be increased. Further, advantageously, embodiments of the present may provide for increased reliability of such connectors by ensuring the electrical contacts are protected from damage and the like. The contact barriers described herein can improve the safety of the connectors and users that install such components, and such contact barriers can protect electrical contacts from damage to the connector in a way that does not considerably increase the size or dimensions of the connector. That is, the contact barriers described herein may be implemented without significant changes in size and/or operation of such connectors.

In addition to providing protection to electrical contacts, embodiments of the present disclosure are directed to ensuring the connection and contact between electrical contacts of the connectors described herein. In some embodiments of the present disclosure, a self-centering feature may be provided to ensure alignment and proper seating and engagement of electrical contacts of the connector assemblies. In accordance with some embodiments of the present disclosure, a self-centering coupling nut is provided that ensures a mechanical mate upon engagement with a receptacle, allowing a user to change hand position and twist the coupling nut to electrically engage the electrical contacts of the two connectors. The self-centering aspect of the coupling nut allows the connector to always be in a “ready-to-mate” position, even when the connector is not mated with a mating connector. As such, in accordance with some embodiments, at least one center biasing element may be configured to bias and self-center a rotatable coupling member relative to a housing and ensure that the assembly or component is positioned into a ready-to-connect orientation. That is, a rotatable coupling member may be rotatably coupled to the housing and biased toward the ready-to-connect orientation.

Additionally, in accordance with some embodiments, one or more rollers are incorporated into the housing and self-centering feature to allow for a reduced required force when electrically engaging two connectors. The rollers and related features provide an enhanced mating function in a connector that requires a high axial mating force and may require a mechanical advantage of torquing the coupling nut to electrically mate a first connector (e.g., plug) and a second connector (e.g., receptacle). Such rollers and self-centering features can improve the mating experience for an end-user. For example, a self-centering coupling nut ensures proper alignment of the electrical contacts and the rollers can reduce the mating torque needed to connect the two connectors and ensure proper force application between the electrical contacts and ensure electrical connection therebetween. Such self-centering and torque-assistance features may be particularly beneficial in connector assemblies similar to that shown and described with respect to FIGS. 1-6.

Figure 17A:
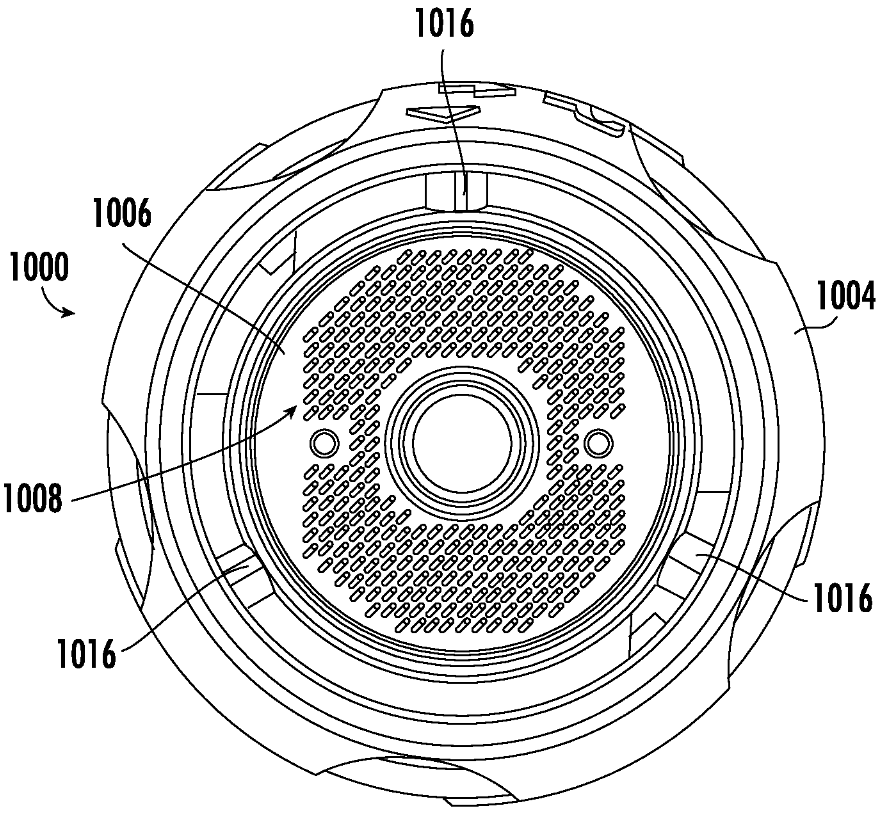
FIG. 17A is a schematic illustration of a first connector of a connector assembly in accordance with an embodiment of the present disclosure.
Figure 17B:
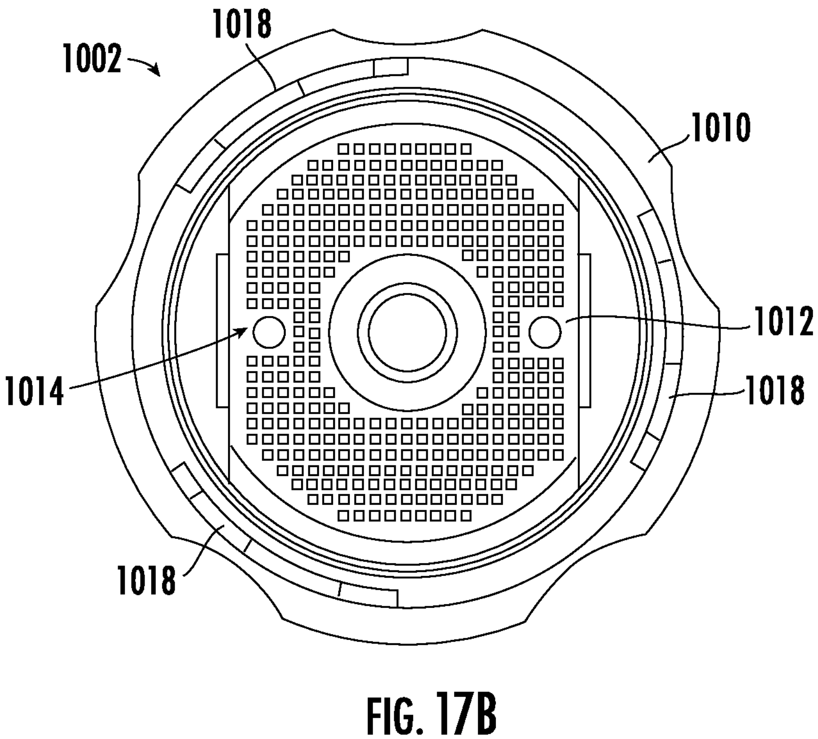
FIG. 17B is a schematic illustration of a second connector of the connector assembly of FIG. 17A that connects to the first connector.

Referring now to FIGS. 17A-17B, schematic illustrations of parts of a connector assembly in accordance with an embodiment of the present disclosure are shown. FIG. 17A illustrates a view of a contact end of a first connector 1000 (e.g., a plug) and FIG. 17B illustrates a view of a contact end of a second connector 1002 (e.g., receptable). The first connector 1000 includes a coupler 1004 and an interposer 1006 with a printed circuit board arranged beneath the interposer 1006. The printed circuit board includes electrical contacts that may be aided by pins 1008 or the like of the interposer 1006. The second connector 1002 includes a body 1010 that houses a printed circuit board (PCB) 1012 having a number of electrical contacts 1014 arranged thereon.

The first connector 1000 mechanically and electrically engages with the second connector 1002. The first connector 1000 may engage with the second connector 1002 as described herein. As the two connectors 1000, 1002 are mechanically coupled, the electrical contacts 1014 of the PCB 1012 of the second connector 1002 will contact the pins 1008 of the interposer 1006. As the mechanical connection is forced into engagement, the pins 1008 of the interposer 1006 of the first connector 1000 and the electrical contacts 1014 of the second connector 1002 will physically contact and create an electrical connection through the connector assembly (e.g., between the electrical contacts of the first connector 1000 and the electrical contacts 1014 of the second connector 1002).

To assist in the joining between the first connector 1000 and the second connector 1002, each of the coupler 1004 and the body 1010 include features for ensuring both physical and electrical connection. For example, in this illustrative embodiment, the coupler 1004 includes latching rollers 1016 which are fixed in place on an interior surface of the coupler 1004 but are rotational about an axis through a center of the latching roller 1016. These latching rollers 1016 fit into and move along latching slots 1018 of the body 1010. The latching slots 1018 are formed on an exterior surface of the body 1010 and include an opening that permits a latching roller 1016 to slide axially into the latching slot 1018. The latching slots 1018 are shaped with a circumferential channel such that as the first connector 1000 is twisted or rotated relative to the second connector 1002, the latching rollers 1016 will roll along the circumferential channels and securely engage the first connector 1000 with the second connector 1002. This operation of mechanically coupling the first connector 1000 to the second connector 1002 also causes the first connector 1000 and the second connector to be urged axially toward each other, ensuring that the electrical contacts are properly made.

Figure 18A:
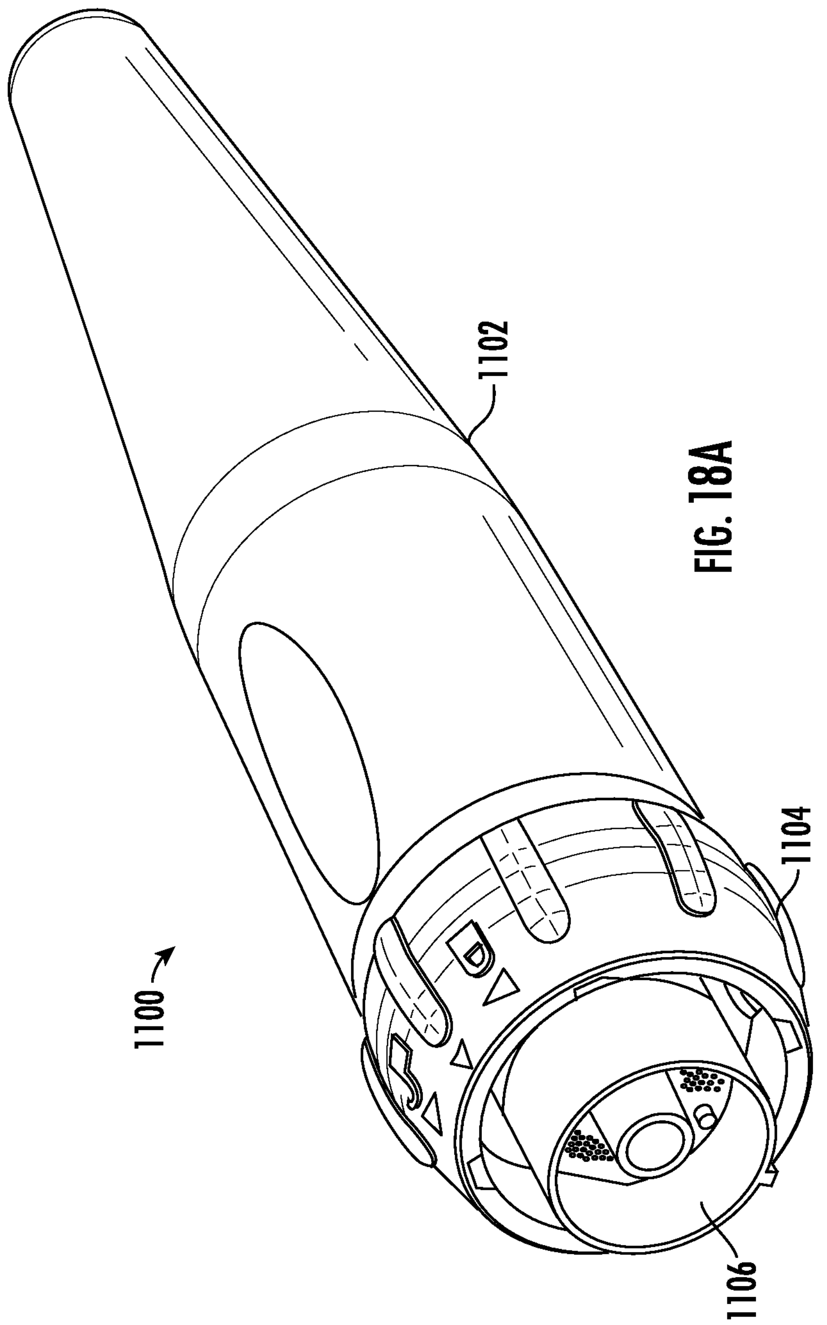
FIG. 18A is a schematic illustration of a connector in accordance with an embodiment of the present disclosure.
Figure 18B:
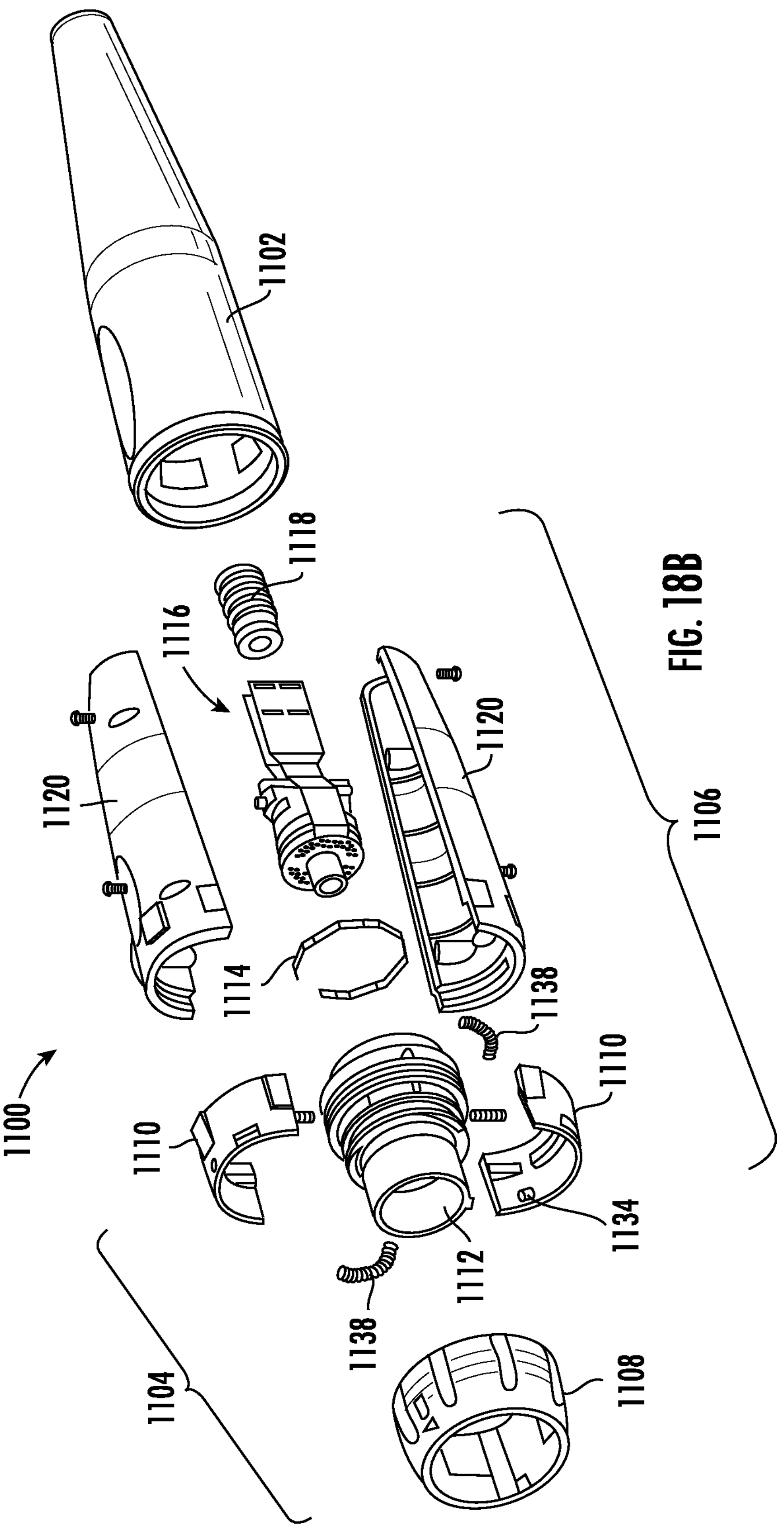
FIG. 18B is an exploded, schematic illustration of components of the connector of FIG. 18A illustrated in a disassembled state.
Figure 18C:
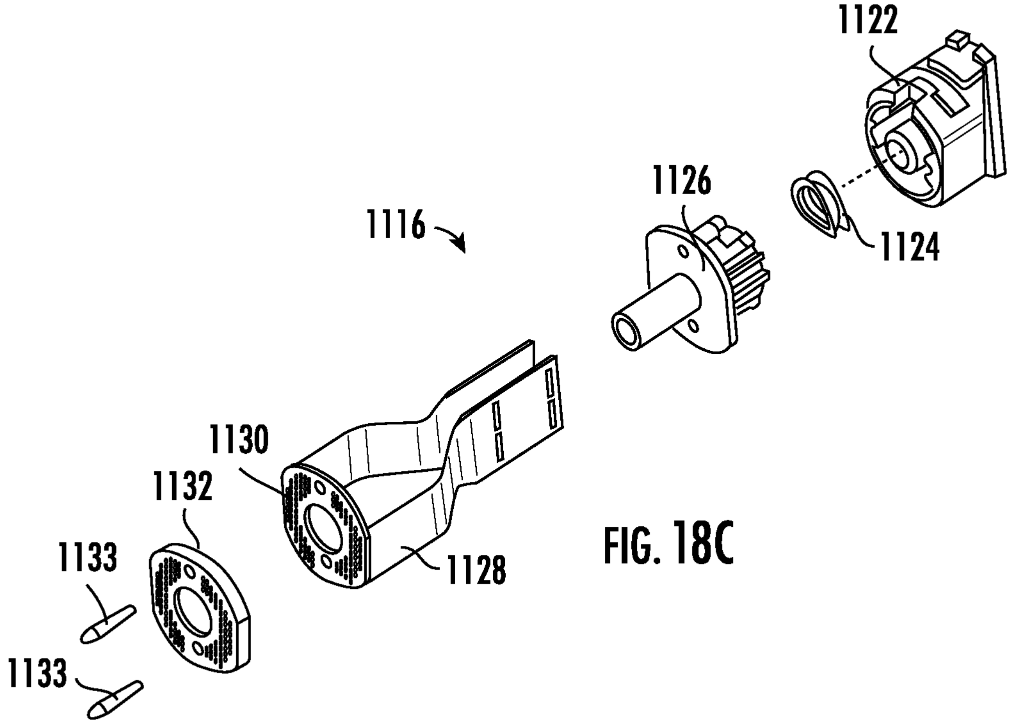
FIG. 18C is a schematic illustration of a plug core assembly of the connector of FIG. 18A.
Figure 18D:
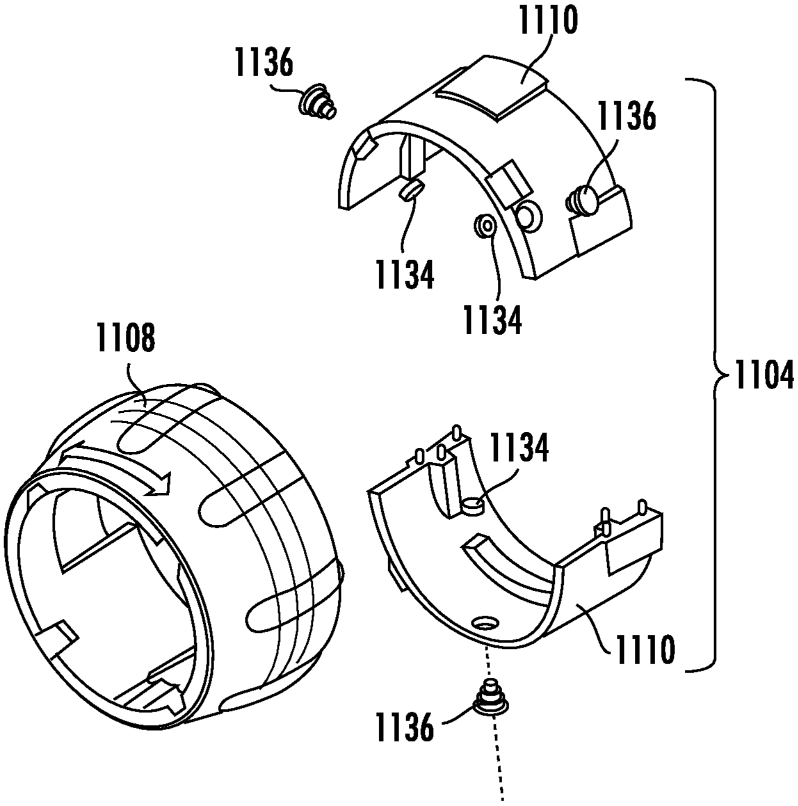
FIG. 18D is a schematic illustration of a coupling member of the connector of FIG. 18A.

Referring now to FIGS. 18A-18D, schematic illustrations of a connector 1100 in accordance with an embodiment of the present disclosure are shown. The connector 1100 is configured as a first connector or a plug of a connector assembly in accordance with an embodiment of the present disclosure. FIG. 18A is a perspective view of the connector 1100, FIG. 18B is a disassembled illustration or exploded view of the components of the connector 1100, FIG. 18C is an illustration of a disassembled or exploded view of the core assembly of the connector 1100, and FIG. 18D is an illustration of a disassembled or exploded view of the coupling member of the connector 1100.

As shown in FIGS. 18A-18B, the connector 1100 includes a strain relief member 1102, a coupling member 1104, and a plug assembly 1106 arranged within the strain relief member 1102 and the coupling member 1104. The coupling member 1104 includes an outer coupling housing 1108 and an inner coupling housing 1110. In this illustrative embodiment, the outer coupling housing 1108 is a single, unitary body and the inner coupling housing 1110 is formed of two housing sections (e.g., clamshell arrangement), but each of these components may be unitary or sectional in other embodiments. The plug assembly 1106, in this illustrative embodiments, includes a plug housing 1112, a shield spring 1114, a plug core assembly 1116, a cable bushing 1118, all arranged within a strain relief housing 1120 (illustrated as a clamshell configuration). The plug assembly 1106 fits within the strain relief member 1102 and the coupling member 1104 secures the plug assembly 1106 at one end of the strain relief member 1102.

Referring to FIG. 18C, a schematic illustration of the components of the plug core assembly 1116 is shown. The plug core assembly 1116 includes a plug core base 1122, an overtravel spring 1124, a plug core flex mount 1126, a flex circuit 1128 having electrical pins 1130, an interposer assembly 1132, and one or more interpose mounting pins 1133 that secure the interposer assembly 1132 to the plug core flex mount 1126.

The coupling member 1104 is configured similar to that shown in FIG. 17A. In this embodiment, the coupling member 1104 includes one or more latching rollers 1134. The latching rollers 1134 are fixed in place to an interior surface of the inner coupling housing 1110. The latching rollers 1134 engage with latching slots of a body of a second connector to which the connector 1100 mechanically and electrically connects, as described herein. FIG. 18D illustrates the coupling member 1104 in a disassembled state, illustrating components of the coupling member 1104. As shown in FIG. 18D, the coupling member 1104 includes an outer coupling housing 1108 and an inner coupling housing 1110. The inner coupling member 1110 is a two-piece component in this illustrative embodiment. The coupling member 1104 includes one or more latching rollers 1134 which are attached to the inner coupling housing 1110 by respective mounting posts 1136. The mounting posts 1136 attach to the inner coupling housing 1110 from an outer side and extend radially inward through apertures of the inner coupling housing 1110. On the inside surface, the latching rollers 1134 are connected and secured to the inner surface of the inner coupling housing 1110 by the mounting posts 1136. When installed, the latching rollers 1134 are free to rotated about the mounting posts 1136.

Because the connector 1100 engages with a second connector through a rotational movement or twisting motion, it is important to ensure that the two connectors are aligned properly such that the electrical connections between the two connectors make appropriate contact. In accordance with this illustrative embodiment, one of the mechanisms for ensuring proper alignment is through use of the latching rollers 1134 which are arranged to slide axially into and then circumferentially along respective latching slots of the other connector. The free rotation of the latching rollers 1134 improves engagement and relative rotation between the two connectors. For example, by employing the latching rollers 1134, the rotational force required to couple the connectors is reduced, thus improving ease of engagement and connection between the two connectors. As such, the latching rollers 1134 allow for a reduced force when electrically engaging the connector 1100 (e.g., plug) with a second connector (e.g., a receptable for the plug).

In addition to having a limited number of latching rollers 1134 and respective latching slots, the alignment between the two connectors may be aided by a self-centering feature in the connector. For example, as shown in FIG. 18B, the connector 1100 may include center biasing elements 1138. The plug core base 1122 may be movable or rotatable relative to the inner coupling housing 1110, and thus the plug core base 1122 may be rotatable to a position that may not immediately align with a second connector. However, the center biasing elements 1138 provide for self-centering of the plug core base 1122 relative to the rest of the connector 1100 such that the connector 1100 will be arranged in a ready-to-connect orientation due to the center biasing elements 1138 biasing in a manner to maintain the plug core base 1122 in a predetermined position or state, and if such state is altered (e.g., the plug core base 1122 is rotated relative to the rest of the connector 1100), the center biasing elements 1138 will urge the plug core base 1122 back to the original (e.g., read-to-connect) position.

The connector 1100, having the center biasing elements 1138, thus forms or has a self-centering coupling nut that provides a mechanical mate upon engagement with a second connector (e.g., a receptacle for a plug) allowing the user to change hand position and twist the coupling nut to electrically engage the two connectors. The self-centering aspect of the coupling nut allows the connector to always be in the "ready to mate" position when it is not mated with the second connector. Although shown and described in various embodiments with two biasing elements, it will be appreciated that a single biasing element may be used, that can urge the coupling nut to the desired position (e.g., single element that is center-positioned to urge back to the desired position). In other embodiments, more than two biasing elements may be used, without departing from the scope of the present disclosure.

Figure 19A:
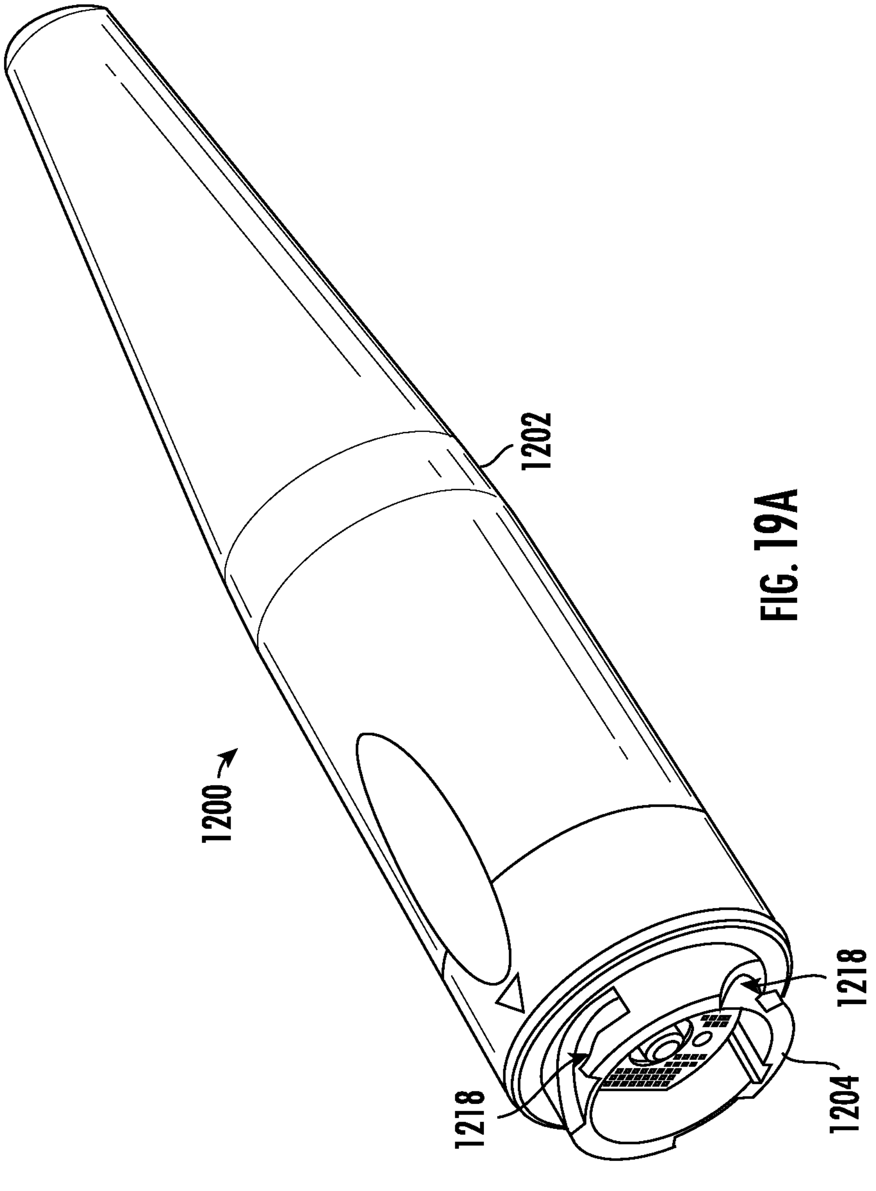
FIG. 19A is a schematic illustration of a connector in accordance with an embodiment of the present disclosure.
Figure 19B:
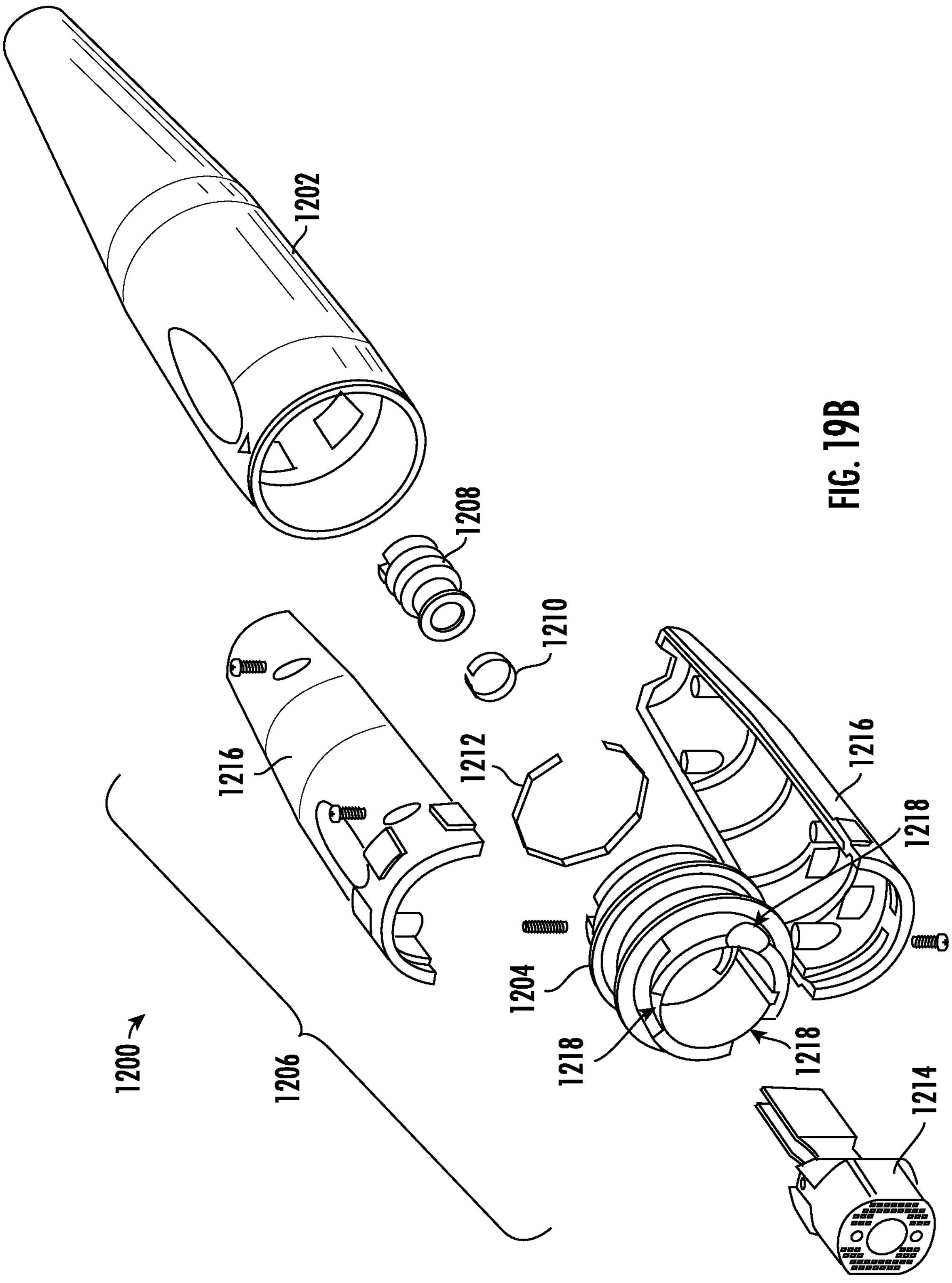
FIG. 19B is an exploded, schematic illustration of components of the connector of FIG. 19A illustrated in a disassembled state.

Referring now to FIGS. 19A-19B, schematic illustrations of a connector 1200 in accordance with an embodiment of the present disclosure are shown. The connector 1200 is configured as a second connector or receptable of a connector assembly in accordance with an embodiment of the present disclosure. FIG. 19A is a perspective view of the connector 1200 and FIG. 19B is a disassembled or exploded illustration of the components of the connector 1200. The connector 1200 of FIGS. 19A-19B may mechanically and electrically engage with the connector 1100 of FIGS. 18A-18D.

The connector 1200 includes a strain relief member 1202 that houses internal comments and a coupling member 1204 that mechanically connects to another connector (e.g., connector 1100 of FIGS. 18A-18D). As shown in FIG. 19B, the connector includes a receptable assembly 1206 that is arranged within the strain relief member 1202. The receptable assembly 1206 includes a cable bushing 1208, a shield clamp 1210, a shield spring 1212, and a receptable core assembly 1214. These components are arranged within a strain relief housing 1216 (illustrated as a clamshell configuration). The receptable assembly 1206 fits within the strain relief member 1202 and the coupling member 1204 secures the plug assembly 1206 at one end of the strain relief member 1202.

The coupling member 1204 of the connector 1200 is similar to the second connector shown in FIG. 17B. The coupling member 1204 includes one or more latching slots 1218 which are arranged to receive respective latching rollers (e.g., as shown and described above) to mechanically connect two connectors together. The latching slots 1218 have an opening on an end of the coupling member 1204 and extend axially and then turn to extend about a circumference of the coupling member 1204. The latching slots 1218 may include one or more features to aid in ensuring electrical connection between electrical contacts of two connected connectors. The features may include protrusions or the like that cause axial movement of the coupling member during a joining or connecting process and may also secure the position by providing a stop or the like to prevent counter rotation after the position is set.

Figure 20A:
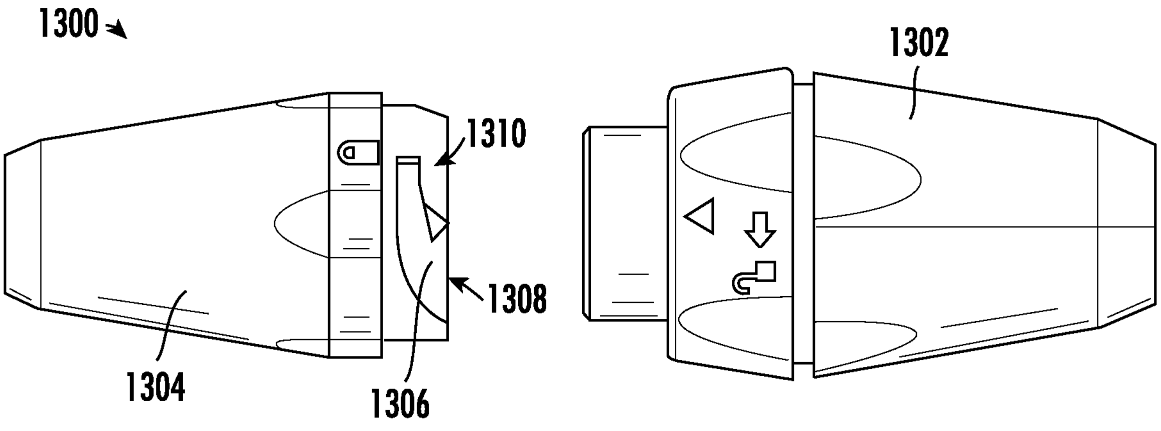
FIG. 20A is a schematic illustration of a connector assembly in accordance with an embodiment of the present disclosure.
Figure 20B:
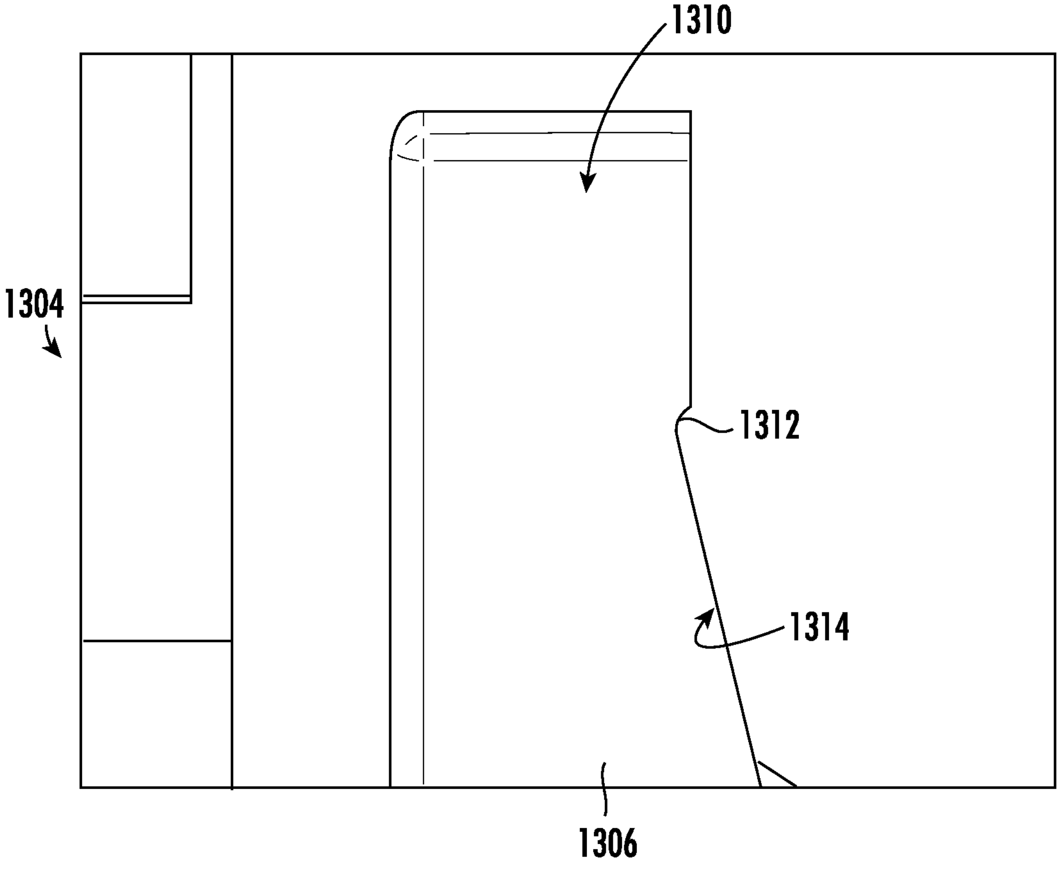
FIG. 20B is an enlarged schematic illustration of a portion of the connector assembly of FIG. 20A.

Referring now to FIGS. 20A-20B, schematic illustrations of a connector assembly 1300 in accordance with an embodiment of the present disclosure are shown. The connector assembly 1300 includes a first connector 1302 and a second connector 1304. The first connector 1302, in this illustrative embodiment, may be configured as a plug and the second connector may be configured as a receptable for receiving the plug. FIG. 20B illustrates an enlarged portion of the second connector 1304. The first connector 1302 may be configured as shown and described above, and may include one or more latching rollers for engagement with latching slots 1306 of the second connector 1304. A portion of a latching slot 1306 is shown in enlarged view in FIG. 20B. The latching slot 1306 receives a latching roller or other latching element (e.g., a non-rolling pin or the like).

The latching element (e.g., roller pin, static pin, protrusion, etc.) enter the latching slot 1306 at an opening 1308 and travel axially relative to the second connector 1304. The latching element will then travel circumferentially within the latching slot 1306 to an end stop region 1310. The end stop region 1310 of the latching slot 1306 includes a detent feature 1312 along a surface that defines the latching slot 1306. The detent feature 1312 is a protrusion or the like that provides various functionality. For example, the detent feature 1312 can provide a back stop structure to prevent, resist, or deter counter rotation, once the latching element has been passed through the latching slot 1306 and rotated into the end stop region 1310, the detent feature 1312 can prevent resist, or deter rotation away from the secured position. In some embodiments, the detent feature 1312 provides resistance to counter-rotation, once the latching element passes the detent feature 1312 and enters the end stop region. Further, for example, the detent feature 1312 can provide an obstruction or resistance to rotation into the end stop region 1310 of the latching element. As such, the detent feature 1312 can force a user to apply a small additional amount of force in the rotation to ensure that the latching element passes over the detent feature 1312 and into the end stop region 1310. Further, although the detent feature 1312 is configured to provide resistance or prevent relative rotation away from the secured position, it will be appreciated that a user can decouple the components by applying force to overcome the resistance provided by the detent feature 1312. That is, the detent feature 1312 may be configured to provide a releasable or reversible connection that ensures a solid connection in the secured position but also permits decoupling and separation of the components after they have been secured together.

The act of the latching element passing over the detent feature 1312 can provide certain advantages. Firstly, for example, because the detent feature 1312 is an axially arranged feature, when the latching element passes over the detent feature 1312, the first connector 1302 will be moved closer to the second connector 1304, thus ensuring that the electrical contacts of the two connectors 1302, 1304 will be in proper electrical engagement. Secondly, for example, because the detent feature 1312 provides some resistance to relative rotation between the two connectors 1302, 1304, a user will be required to apply additional rotational force and would be able to feel the snap or tactile feedback of the latching element passing over the detent feature 1312 and into the end stop region 1310. In some embodiments, to decouple the first connector 1302 from the second connector 1304, additional force may be required to pass the latching element over and past the detent feature 1312. Such force may be applied by pressing or forcing the two connectors 1302, 1304 toward each other, and then twisting the two connectors 1302, 1304 relative to each other, thus permitting the latching element to pass by the detent feature 1312 and allow separation of the two connectors. In some embodiments, and as shown in FIG. 20B, the latching slot 1306 may also include or be defined by an optional angled wall 1314. The angled wall 1314 may be angled in an axial direction to narrow an axial dimension of the latching slot 1306. The angled wall 1314 may provide a surface along which the latching element may roll, slide, or otherwise interact with. Because the angled wall 1314 is angled, as a user rotates the first connector 1302 relative to the second connector 1304, the latching element will be urged axially, even if only rotational force is applied by the user. That is, when connecting the first connector 1302 to the second connector 1304, there is no requirement that the user apply an axial force to bring the two connectors 1302, 1304 together. Rather, in such configurations, by applying a rotational force, the latching element will slide along the angled wall 1314 and cause an axial movement of the first connector 1302 toward the second connector 1304.

Although shown and described with the detent feature on one structure and the latching element on another, the specific components having each structure/feature is not to be limiting. That is, in other embodiments, the components having the detent feature and the latching element may be swapped as compared to the illustrative embodiment, without departing from the scope of the present disclosure.

Referring now to FIGS. 21A-21D, schematic illustrations of operation of joining a connector assembly 1400 together in accordance with an embodiment of the present disclosure are shown. The connector assembly 1400 includes a first connector 1402 (e.g., a plug) and a second connector 1404 (e.g., a receptable). The first connector 1402 and the second connector 1404 may be configured similar to that shown and described above. The first connector 1402 includes a latching element 1406, such as a pin, a roller pin, a ball bearing, or the like, that is received in a latching slot 1408 of the second connector 1404. The latching slot 1408 includes a detent feature 1410 and an end stop region 1412, similar to that shown and described above.

Figure 21A:
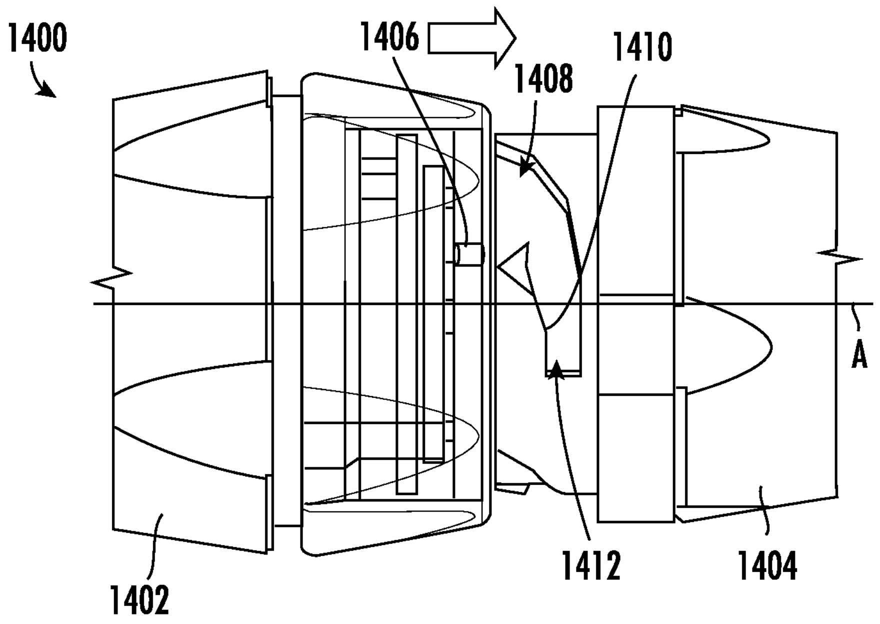
FIG. 21A is a schematic illustration of a step of joining together a connector assembly in accordance with an embodiment of the present disclosure.
Figure 21B:
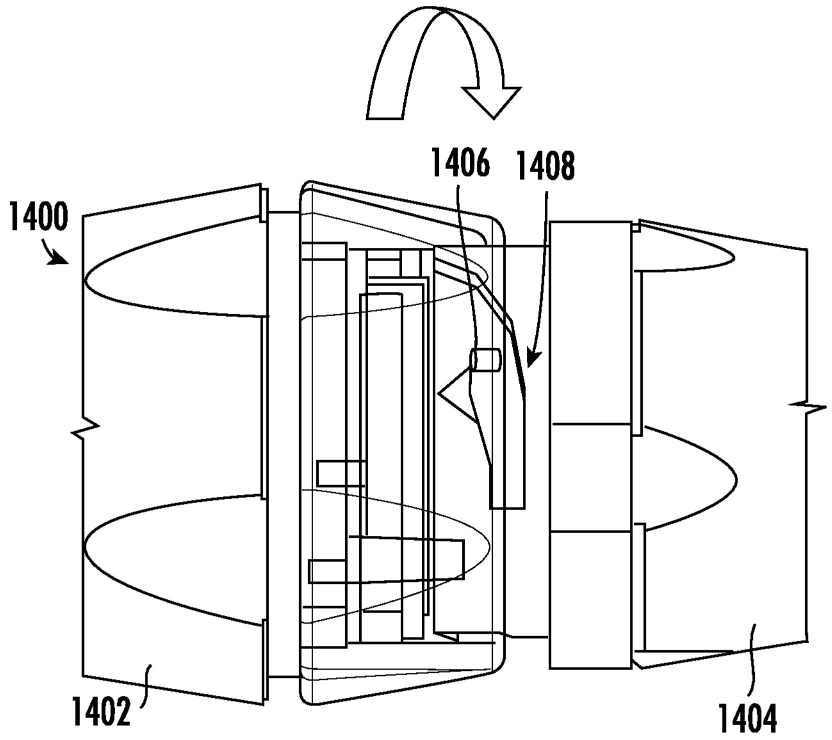
FIG. 21B is a schematic illustration of another step of joining together the connector assembly of FIG. 21A.
Figure 21C:
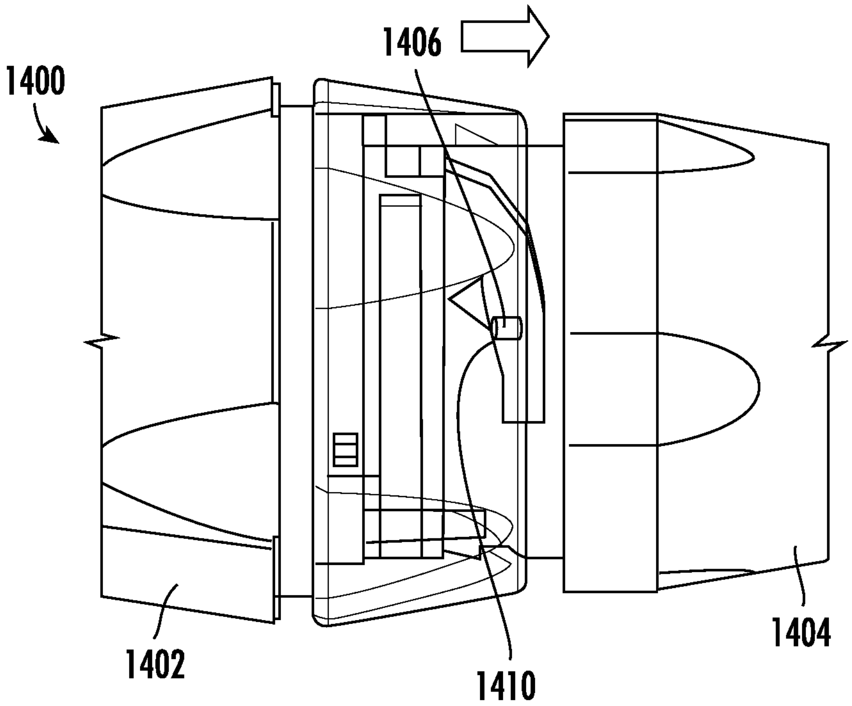
FIG. 21C is a schematic illustration of another step of joining together the connector assembly of FIG. 21A.
Figure 21D:
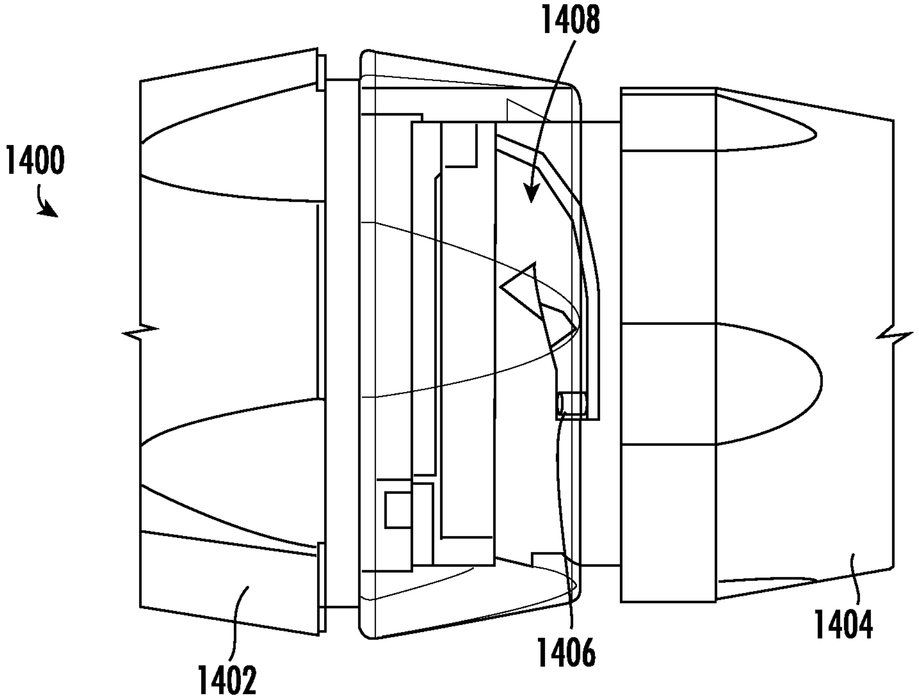
FIG. 21D is a schematic illustration of another step of joining together the connector assembly of FIG. 21A.

FIGS. 21A-21D illustrate the engagement and connection between the first connector 1402 and the second connector 1404. As shown in FIG. 14A, the latching element 1406 of the first connector 1402 is aligned with the latching slot 1408 and moved axially (e.g., along and axis A defined through the connector assembly 1400). Once the latching element 1406 is within the latching slot 1408, the first connector 1402 may be rotated relative to the second connector 1404, which will cause the latching element 1406 to move circumferentially about the second connector 1404 within the latching slot 1408, as shown in FIG. 21B. The latching element 1406 will then contact the detent feature 1410 and require additional axial force as shown in FIG. 21C. The additional axial force, applied with some rotation, will cause the latching element 1406 to pass over the detent feature 1410 and move into the end stop region 1412, as shown in FIG. 21D. The use of a latching roller as the latching element 1406 reduces the rotational force required to couple the connectors 1402, 1404 during the connection process described herein.

Advantageously, improved connectors are provided by various embodiments of the present disclosure. Various aspects improve protection of sensitive components of the connectors. In a linear connector assembly configuration, the electrical contacts of the connectors may be protected when one connector is disconnected from another and such electrical contacts may otherwise be exposed. Further, such protected electrical contacts can prevent direct touching or contact with the electrical features and thus prevent damage to the connector. Further, in some embodiments, when a rotational connection is employed, the electrical contact and the mechanical connection may be aided by latching rollers and/or detent features on the connectors.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "upper," "lower," "above," "below," and the like are with reference to the illustrated configurations and orientations and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An electrical connector, comprising:

a housing defining a longitudinal mating axis;

a contact member arranged within the housing, the contact member comprising one or more electrical contacts, the contact member configured to mate with a second connector in a direction perpendicular to the longitudinal mating axis; and a contact barrier connected to the housing, the contact barrier movable between a closed state and an open state, wherein in the open state the contact member is exposed and in the closed state the contact member is protected by the contact barrier, wherein the contact barrier is biased into the closed state, wherein the contact barrier comprises a first panel and a second panel that are hingedly attached to the housing, and wherein the first panel and the second panel are configured to open in a direction normal to the longitudinal mating axis in response to mating with the second connector.

2. The electrical connector of claim 1, further comprising a coupling nut that is configured to rotate between a locked position and an unlocked position, wherein the housing is attached to the coupling nut.

3. The electrical connector of claim 1, wherein the contact member is a rigid-flexible printed circuit board.

4. The electrical connector of claim 1, wherein the contact barrier comprises at least one engagement feature that is configured to interact with a portion of the second connector to cause the contact barrier to move from the closed state to the open state as the electrical connector is inserted into the second connector.

5. The electrical connector of claim 1, wherein the contact barrier comprises at least one of a non-conductive material and a semi-rigid material.

6. The electrical connector of claim 1, wherein the contact barrier defines a grounding path therethrough.

7. The electrical connector of claim 4, wherein the at least one engagement feature comprises angled or chamfered surfaces configured to engage with a second engagement feature of the second connector.

8. An electrical connector, comprising:

a housing defining a longitudinal mating axis;

a contact member arranged within the housing, the contact member comprising one or more electrical contacts, the contact member configured to mate with a second connector in a direction perpendicular to the longitudinal mating axis; and a contact barrier connected to the housing, the contact barrier movable between a closed state and an open state, wherein in the open state the contact member is exposed and in the closed state the contact member is protected by the contact barrier, wherein the contact barrier is biased into the closed state, wherein the contact barrier comprises a panel that is configured to slidingly move relative to the housing, and wherein the panel is configured to slidingly open in a direction parallel to the longitudinal mating axis in response to mating with the second connector.

9. The electrical connector of claim 8, wherein the contact barrier is configured to be wound about a spool when the contact barrier is moved from the closed state to the open state.

10. The electrical connector of claim 8, further comprising a coupling nut that is configured to rotate between a locked position and an unlocked position, wherein the housing is attached to the coupling nut.

11. The electrical connector of claim 8, wherein the contact member is a rigid-flexible printed circuit board.

12. The electrical connector of claim 8, wherein the contact barrier comprises at least one engagement feature that is configured to interact with a portion of the second connector to cause the contact barrier to move from the closed state to the open state as the electrical connector is inserted into the second connector.

13. The electrical connector of claim 8, wherein the contact barrier comprises at least one of a non-conductive material and a semi-rigid material.

14. The electrical connector of claim 8, wherein the contact barrier defines a grounding path therethrough.

15. The electrical connector of claim 8, wherein the contact barrier is configured to slide axially in the direction of the longitudinal mating axis when the contact barrier is moved from the closed state to the open state.

* * * * *